(12) United States Patent
Fukuta et al.

(10) Patent No.: US 7,859,764 B2
(45) Date of Patent: Dec. 28, 2010

(54) VARIABLE-POWER OPTICAL SYSTEM, IMAGE PICKUP DEVICE, AND DIGITAL APPARATUS

(75) Inventors: Yasunari Fukuta, Sakai (JP); Soh Ohzawa, Toyonaka (JP); Keiji Matsusaka, Osaka (JP)

(73) Assignee: Konica Minolta Opto, Inc., Hachioji-shi, Tokyo ( * ) Notice: Subject to any disclaimer, the term of this patent is extended or adjusted under 35 U.S.C. 154(b) by 0 days.

(21) Appl. No.: 12/519,566

(22) PCT Filed: Dec. 6, 2007

(86) PCT No.: PCT/JP2007/073576

§ 371 (c)(1),
(2), (4) Date: Jun. 17, 2009

(87) PCT Pub. No.: WO2008/075566

PCT Pub. Date: Jun. 26, 2008

(65) Prior Publication Data

US 2009/0303612 A1 Dec. 10, 2009

(30) Foreign Application Priority Data

Dec. 20, 2006 (JP) .............................. 2006-343202

(51) Int. Cl.
*G02B 15/14* (2006.01)
(52) U.S. Cl. ...................... 359/682; 359/689
(58) Field of Classification Search ................ 359/676, 359/680–682, 686, 689
See application file for complete search history.

(56) References Cited

U.S. PATENT DOCUMENTS

| 6,515,804 | B2 * | 2/2003 | Watanabe et al. | 359/689 |
|---|---|---|---|---|
| 6,809,881 | B2 * | 10/2004 | Watanabe et al. | 359/689 |
| 2003/0169508 | A1 | 9/2003 | Ori | 359/680 |
| 2004/0136705 | A1 | 7/2004 | Suzuki | 396/72 |
| 2004/0223231 | A1 | 11/2004 | Sekita | 359/680 |
| 2005/0013014 | A1 | 1/2005 | Mizuguchi et al. | 359/680 |
| 2006/0109557 | A1 | 5/2006 | Maetaki | 359/642 |
| 2008/0180810 | A1 * | 7/2008 | Ito | 359/689 |

FOREIGN PATENT DOCUMENTS

| JP | 5-323190 A | 12/1993 |
|---|---|---|
| JP | 2002-82284 A | 3/2002 |
| JP | 3333473 B2 | 7/2002 |
| JP | 2003-50352 A | 2/2003 |

(Continued)

*Primary Examiner*—Darryl J Collins
(74) *Attorney, Agent, or Firm*—Sidley Austin LLP

(57) ABSTRACT

A variable-power optical system includes, in order from an object side thereof: a first lens group with a negative optical power; a second lens group with a positive optical power, moving when the power of the variable-power optical system varies; and a third lens group with a positive or negative optical power. The first lens group includes two or more lenses including one positive lens and one negative lens which include at least two or more lenses made of a plastic material. The variable-power optical system satisfies the predetermined conditional expressions relating to is a focal length of the first lens, a focal length of the second lens, a composite focal length of the total optical system, and an image-forming magnification of the second lens group at a telephoto end.

19 Claims, 15 Drawing Sheets

FOREIGN PATENT DOCUMENTS

| | | |
|---|---|---|
| JP | 2003-177314 A | 6/2003 |
| JP | 2003-228002 A | 8/2003 |
| JP | 2004-61675 A | 2/2004 |
| JP | 2004-93917 A | 3/2004 |
| JP | 2004-205813 A | 7/2004 |
| JP | 2004-333767 A | 11/2004 |
| JP | 2005-208566 A | 8/2005 |
| JP | 2005-283709 A | 10/2005 |
| JP | 2006-145823 A | 6/2006 |
| WO | WO 2008/075566 A1 | 6/2008 |

* cited by examiner

VARIABLE-POWER OPTICAL SYSTEM, IMAGE PICKUP DEVICE, AND DIGITAL APPARATUS

RELATED APPLICATIONS

This application is a U.S. National Stage Phase Application under 35 U.S.C. 371 of International Application No. PCT/JP2007/073576, filed with the Japanese Patent Office on Dec. 6, 2007, which is based on Japanese Patent Application No. 2006-343202.

TECHNICAL FIELD

The present invention relates to a variable-power optical system including a plurality of lens groups wherein power is varied by changing a space between lens groups in an optical axis direction, an image pickup device equipped with this variable-power optical system, and a digital apparatus with this image pickup device mounted thereon, particularly to a variable-power optical system suited for extremely miniaturized configurations.

BACKGROUND ART

In recent years, there has been a remarkable spread of mobile phones and PDAs (Personal Digital Assistant). It has become a common practice to incorporate a compact digital still camera unit and digital video unit in such devices. These devices are characterized by severe restrictions on the size and cost. Therefore, there has been generally used a small-sized image pickup device equipped with a smaller number of pixels than that in a normal digital still camera, and a single focus optical system including about one to four plastic lenses. However, the magnification of a single focus optical system is on the same level as that in visual observation, and therefore, only the object located close to the operator can be captured. In the image pickup device mounted on a mobile information terminal, technology is advancing rapidly toward a further increase in pixel level and functional level. In this context, there has been an intense demand for a compact variable-power optical system compatible with an image pickup element of high pixel level and capable of capturing the image of a subject located far away from a user, wherein this variable-power optical system can be mounted on a mobile phone and others.

An example of a variable-power optical system of compact configuration is found, for example, in Patent Literatures 1 through 3 which disclose what is called a negative-positive two-component variable-power optical system composed of a first lens group having a negative power and a second lens group having a positive power arranged in that order as viewed from the object side. Further, for the purpose of implementing a less costly optical system of compact configuration, the Patent Literature 4 discloses a negative-positive-negative three-component variable-power optical system wherein all lenses are made of plastics. One of the systems having been recently proposed is a negative-positive-positive three-component variable-power optical system which is considered as the most advantageous for implementing the compact configuration of an optical system. Especially the Patent Literature 5 discloses a variable-power optical system of compact configuration using only two through four lenses. The Patent Literature 6 discloses the same negative-positive-positive three-component variable-power optical system, wherein more than 50 percent of all the lenses are made of plastics to ensure enhanced productivity.

Patent Literature 1: Japanese Patent No. 3333473
Patent Literature 2: Japanese Unexamined Patent Application Publication No. 2002-82284
Patent Literature 3: Japanese Unexamined Patent Application Publication No. 2005-208566
Patent Literature 4: Japanese Unexamined Patent Application Publication No. Hei 05-323190
Patent Literature 5: Japanese Unexamined Patent Application Publication No. 2003-177314
Patent Literature 6: Japanese Unexamined Patent Application Publication No. 2003-50352

DISCLOSURE OF INVENTION

Technical Problem

However, the negative-positive two-component variable-power optical system proposed in Patent Literatures 1 through 3 hardly ensures correction of various types of aberrations, and hardly copes with the requirements of a recent image pickup element of enhanced pixel level. Further, in the variable-power optical system of the Patent Literature 1, all the lenses are made of plastics. However, the negative-positive two-component variable-power optical system is large in the overall optical length and in the traveling distance of the first and second lens groups at the time of varying its power. This makes it difficult to implement a compact configuration of the entire image pickup lens apparatus including the optical system.

In the negative-positive-negative three-component variable-power optical system proposed in the Patent Literature 4, each lens group is made up of one lens. Therefore, aberrations in each lens group are corrected insufficiently, and aberrations of the entire optical system increase. In particular, the second lens group in charge of varying power has a great amount of power. Use of only one lens for the lens group will put the system at a disadvantage in correcting the longitudinal chromatic aberration. Further, there is further disadvantage that the F value is low about 7 through 10, which exhibits a reduced brightness level.

In the negative-positive-positive three-component variable-power optical system proposed in the Patent Literature 5, each of the first and third lens groups is made of one lens, but this structure exhibits insufficient aberration correction. The Patent Literature 6 uses a plurality of glass lenses, and as many as seven or eight lenses at that. The overall optical length is also excessive, and there is room for improvement both in the size and cost.

As described above, the conventional variable-power optical system exhibits such a tendency that, if an attempt is made to meet the requirements of a large-sized and high-pixel image pickup element, the number of lenses has to be increased, and the overall optical length has to be increased. Use of glass lenses—particularly glass-made aspheric lenses—is advantageous to meet the requirements of both the compact configuration and high image quality of a variable-power optical system, but this will increase the weight and cost. Further, production of an aspheric glass lens requires a high level of machining accuracy. This is not suitable for high-volume production. Further, the variable-power optical system generally provides a greater traveling distance of lenses than the auto-focusing system containing a lens-movable portion similarly. When there is an additional disadvantage of the weight having to be increased by the use of a great number of glass lenses, upsizing of the lens drive apparatus will be unavoidable.

Use of a greater number of plastic lenses is preferred from the viewpoint of reducing the cost and weight. However, plastic lenses have disadvantages such as difficulties in compact configuration due to smaller optical power, difficulties in correcting chromatic aberration, and increased fluctuations of back focusing caused by a change in ambient temperature. Further, an attempt made to implement compact configuration of a glass lens or plastic lens will entail an increased sensitivity to errors inside the lens group in charge of varying the power. This requires adjustment between lenses. Thus, the conventional variable-power optical system has failed to meet the requirements for reduced costs, enhanced pixel level and compact size that allows the system to be mounted on a mobile phone or mobile information terminal.

In view of the prior art problems described above, it is an object of the present invention to reduce a weight of lenses in a movable lens group and to decrease a load on a lens drive apparatus, thereby implementing a compact configuration. Another object of the present invention is to provide a compact and low-cost variable-power optical system which virtually eliminates the need of interpolation when capturing an enlarged image by the electronic zooming method and which is capable of coping with an image pickup element of enhanced pixel level on the order of 2 million pixels or more.

Solution to Problem

To solve the aforementioned technical problems, the present invention provides a variable-power optical system, image pickup device and digital apparatus having the following configuration. The terms used in the following description of this Specification are defined as follows:

(a) Refractive index indicates a value with respect to the wavelength of the d line (587.56 nm).

(b) Abbe number is defined as value vd obtained from the following formula when the refractive indexes with respect to the d line, F line (486.13 nm) and C line (656.28 nm) are assumed as nd, nF and nC, and the Abbe number is assumed as vd:

$$vd=(nd-1)/(nF-nC)$$

(c) The representation for a surface shape is based on paraxial curvature.

(d) The terms "concave", "convex", and "meniscus" used with respect to lenses are defined as representing the shape of the lenses in the vicinity of the optical axis (around the center of the lens) (as a representation based on the paraxial curvature).

1. A variable-power optical system comprising, in order from an object side thereof: a first lens group with a negative optical power; a second lens group with a positive optical power, moving when a power of the variable-power optical system varies; and a third lens group with a positive or negative optical power, wherein the first lens group comprises two or more lenses including one positive lens and one negative lens which include at least two or more lenses made of a plastic material, and the variable-power optical system satisfies the following expressions (1) through (3):

$$0.5<|f1/f2|<1.4 \quad (1)$$

$$0.5<f2/fw<2.0 \quad (2)$$

$$-3.2<\beta 2t<-1.4 \quad (3)$$

In the expressions, f1 is a focal length of the first lens, f2 is a focal length of the second lens, fw is a composite focal length of a total optical system at a wide-angle end, $\beta 2t$ is a image-forming magnification of the second lens group at a telephoto end.

This configuration is provided as a so-called negative-lead optical system, in which the first lens group located closest to the object has a negative optical power. This ensures that a quick reduction in angle of light coming from the object side at a large angle is provided by the negative optical power of the first lens group, and the overall optical length and the front lens diameter are reduced in terms of size, which are advantageous. Further, in the negative-lead configuration, an increase in error sensitivity can be reduced even when a compact configuration of the optical system is achieved. Further, the first lens group includes at least one negative lens and one positive lens. This structure ensures the effective correction of chromatic aberration of magnification and curvature of field. Generally, when the first lens group is composed of one negative lens, it is difficult to increase the power of the first lens group, in order to reduce the chromatic aberration of magnification and curvature of field in the first lens group, with the result that the front lens diameter is increased. According to this structure, however, the power of the first lens group can be increased, and the chromatic aberration of magnification and curvature of field in the first lens group can be reduced at the same time. This eliminates the need of increasing the diameter of the front lens in the first lens group.

Further, a third lens group is provided to share a load of an increased power of a zoom lens resulting from the compact configuration of the image pickup element. This arrangement reduces a power of a zoom system composed of the first and second lens groups, whereby aberration caused in each lens group is reduced, and excellent optical performances are ensured. Further, plastic lenses are included in the first lens group in which the outer diameter of lenses is greater than that in other lens groups. This arrangement reduces the product cost and weight as compared to the case of using glass lenses.

Use of many plastic lenses in one lens group reduces a cost of producing lenses with a large effective diameter. This structure leads to a substantial cost cutdown, but increases the overall length. To solve this problem, an attempt is made to reduce the overall length. The result is, however, that performances are much deteriorated even when there is a slight decentration in the second lens group. In this context, based on the conditional expressions (1) through (3), the present invention has succeeded in manufacturing a low-cost, compact product while providing enhanced optical performances and reduced sensitivity to manufacturing errors. The conditional expression (1) is intended to ensure adequate distribution of the optical power of the first and second lens groups. If the f1/f2 is below the lower limit of the conditional expression (1), the power of the first lens group is increased, and that of the second lens group is reduced, with the result that aberration of the first lens group cannot be corrected sufficiently by the second lens group. Thus, the performance will be insufficient. If the power of the first lens group including a large quantity of plastics is increased, processability will be reduced and the cost will be increased. If an attempt is made to get a high variable-power ratio, the traveling distance of the second lens group will be increased and the overall length will also be increased. When the value of the conditional expression (1) exceeds the upper limit, the power of the first lens group using a large quantity of plastics will be reduced. It provides molding advantages, and reduces the traveling length of the second lens group and hence the overall length can be reduced. However, there will be a serious deterioration in performances when there is a slight decentration of the second lens group as a moving lens group. To ensure the satisfactory performances of the entire optical system as a final product, much time will have to be spent on adjustment and mold correction. This will result in an increased cost. Further, the power of the second lens group at the wide-angle end is defined by the conditional expression (2), whereby further reduced cost and overall length can be ensured at the same time. If the value of the conditional expression (2) is below the lower limit, there will be a serious deterioration in performances when there is a slight decentration of the second lens group as a moving lens group. To ensure the satisfactory performances of the entire optical system as a final product, much time will have to be spent on adjustment and mold correction. This will result in an increased cost. If the value of the conditional expression (2) exceeds the upper limit, the traveling distance of the second lens group and hence the overall length will be increased by an attempt of getting a higher variable-power ratio. When the image-forming magnification of the second lens group at the telephoto end is defined by the conditional expression (3), the overall length can be reduced even if the power varies without scarifying the reduced cost. If the value of the conditional expression (3) is below the lower limit, there will be a serious deterioration in performances when there is a slight decentration of the second lens group as a moving lens group. To ensure the satisfactory performances of the entire optical system as a final product, much time will have to be spent on adjustment and mold correction. This will result in an increased cost. If the value of the conditional expression (3) exceeds the upper limit, the traveling distance of the second lens group and hence the overall length will be increased by an attempt of getting a higher variable-power ratio.

2. The variable-power optical system of Item 1, wherein the relationship of $|f1/f2|$ in the conditional expression (1) satisfies the following conditional expression (1)':

$$1.0<|f1/f2|<1.4 \quad (1)'$$

If the conditional expression (1)' satisfied, the negative power of the first lens group 11 is weaker than the positive power of the second lens group 12, with the result that correction of negative distortion is facilitated.

3. The variable-power optical system of Item 1 or 2, wherein the relationship of f2/fw in the conditional expression (2) satisfies the following conditional expression (2)':

$$1.2<f2/fw<1.8 \quad (2)'$$

If the conditional expression (2)' is satisfied, the optical power of the second lens group 12 is weak, which causes a disadvantageous in decreasing the overall length. However, the sensitivity to manufacturing errors of the second lens group 12 as a moving lens group is reduced. Further, the optical power of the second lens group 12 will be increased, which reduces the overall length.

4. The variable-power optical system of any one of Items 1 through 3, wherein β2t in the conditional expression (3) satisfies the following conditional expression (3)':

$$-2.3<\beta 2t<-1.4 \quad (3)'$$

If the conditional expression (3)' is satisfied, the second lens group 12 can be composed of two lenses. The cost is reduced because of the reduced number of lenses.

5. The variable-power optical system of any one of Items 1 through 4, further comprising an aperture stop in the second lens group, wherein the variable-power optical system satisfies the following conditional expression (4):

$$0.25<Lsw/Lw<0.70 \quad (4)$$

In the expression, Lsw is a distance from the aperture stop to an image plane, at the wide-angle end, and Lw is a total length at the wide-angle end.

In this configuration, the aperture stop moves together with the second lens group having the greatest traveling distance. This arrangement suppresses a possible increase in the effective outer diameter of the lenses in the second lens group. Not only that, light on the image side is easily brought into telecentric condition by the lens group closest to the image. Further, when the Lsw/Lw is below the lower limit of the conditional expression (4), telecentricity at the wide-angle end is hardly maintained properly. If the upper limit of the conditional expression (4) has been exceeded, traveling distance of lens groups will be reduced at the time of varying the power. This requires the optical power of the second lens group to be much increased. This will entail manufacturing difficulties and noticeable tendency toward deterioration of optical performances.

6. The variable-power optical system of any one of Items 1 through 5, wherein a lens at a closest position to the object side in the second lens group has a positive optical power, and the variable-power optical system satisfies the following conditional expression (5):

$$0.2<f21/fw<1.6 \quad (5)$$

In the expression, f21 is a focal length of the lens at the closest position to the object side in the second lens group.

If the f21/fw is below the lower limit of the conditional expression (5), the angle of refraction of an off-axis principal ray emitted from the first lens group will be excessively increased, and off-axis aberration will occur noticeably. If the f21/fw exceeds the upper limit of the conditional expression (5), generation of the off-axis aberration is hardly be suppressed.

7. The variable-power optical system of Item 6, wherein the relationship of f21/fw in the conditional expression (5) satisfies the following conditional expression (5)':

$$0.6<f21/fw<1.3 \quad (5)'$$

When the conditional expression (5)' is satisfied, the longitudinal chromatic aberration can be reduced and the number of lenses to correct this aberration can be reduced. Further, the overall length can be reduced because of the increased power of the second lens group 12.

8. The variable-power optical system of any one of Items 1 through 7, wherein each lens in the first lens group is formed of a plastic material.

In this structure, plastic material is used to manufacture all the lenses of the first lens group wherein the outer diameter of the lens is greater than that in the second lens group due to a longer distance from the aperture stop position. This arrangement reduces the cost as compared to that with glass lenses. Further, this arrangement makes it easier to reduce the weight of the variable-power optical system.

9. The variable-power optical system of any one of Items 1 through 8, wherein a lens at a closest position to the object side in the first lens group has a negative optical power, and the variable-power optical system satisfies the following conditional expression (6):

$$-1.2<f11/ft<-0.2 \quad (6)$$

In the expression, f11 a focal length of the lens at the closest position to the object side in the first lens group.

If the f11/ft is below the lower limit of the conditional expression (6), the power of the lens (first lens) closest to the object in the first lens group will be reduced, and the diameter of the front lens of the first lens group 11 or the overall length will be increased. If the f11/ft has exceeded the lower limit of the conditional expression (6), the power of the first lens group will be excessively increased and the aberration is hardly corrected. For example, the negative distortion or curvature of field will be excessively over-corrected.

10. The variable-power optical system of Item 9, wherein the relationship of f11/ft in the conditional expression (6) satisfies the following conditional expression (6)':

$$-1.2 < f11/ft < -0.2 \qquad (6)'$$

If the conditional expression (6)' is satisfied, the Petzval's sum is reduced sufficiently, and an excellent property of image plane is obtained. Further, manufacturing ease is ensured by the gradual curvature of the negative lens.

11. The variable-power optical system of any one of Items 1 through 10, wherein a lens at a closest position to an image side in the first lens group has a positive optical power.

When this structure is adopted, the lens located closest to the image in the first lens group and having a positive optical power generates aberrations having the sign reverse to those of longitudinal chromatic aberration and chromatic aberration of magnification. This allows fluctuation of aberrations to be cancelled. Thus, the chromatic aberration can be reduced at the time of varying the power.

12. The variable-power optical system of any one of Items 1 through 11, wherein a positive lens or lenses and a negative lens or lenses in the first lens group have Abbe numbers satisfy the following conditional expression (7):

$$10 < v1n - v1p < 35 \qquad (7)$$

In the expression, $v1n$ is a mean Abbe number of the negative lens or lenses in the first lens group, and $v1p$ is a mean of Abbe number of the positive lens or lenses in the first lens group.

If the ($v1n-v1p$) is below the lower limit of the conditional expression (7), the chromatic aberration of magnification is hardly corrected in the first lens group. If the ($v1n-v1p$) exceeds the upper limit of the conditional expression (7), it will be difficult to obtain a plastic material with an excellent property in view of general versatility and an optical material.

13. The variable-power optical system of Item 12, wherein the relationship of ($v1n$-$v1p$) in the conditional expression (7) satisfies the following conditional expression (7)':

$$23 < v1n - v1p < 30 \qquad (7)'$$

If the conditional expression (7)' is satisfied, the chromatic aberration of magnification can be corrected sufficiently in the first lens group 11. The plastic material meeting this conditional expression provides stable properties free from any problem with hygroscopicity.

14. The variable-power optical system of any one of Items 1 to 13, wherein the first lens group is consists of two lenses.

If the first lens group is made of two lenses alone, the weight of the lens group is reduced and the load on a drive apparatus at the time of varying the power is also reduced. In this case, the first lens group is made of two lenses, a negative plastic lens made and a positive plastic lens. Even if there are employed plastic-made lenses providing a greater change in shape and refractive index due to temperature variations as compared to that in the glass-made lenses, this structure cancels these adverse effects and minimizes the performance deterioration resulting from temperature variations.

15. The variable-power optical system of any one of Items 1 through 14, wherein the second lens group is consists two lenses.

When this structure is adopted, the second lens group makes a significant contribution to varying power and has the longest traveling distance at the time of varying power. Thus, the second lens group is made of as small as two lenses, whereby the weight is reduced and the load on the drive apparatus for varying power is reduced.

16. The variable-power optical system of any one of Items 1 through 15, wherein the variable-power optical system adjusts a focal position from an object at an infinity distance to an object at a near distance by moving the first lens group toward the object side.

The fluctuation in aberrations resulting from traveling of the first lens group is comparatively small. Thus, the adjusting operation for the focal position is performed by movement of the first lens group toward the object side, whereby performance deterioration caused by the operation can be minimized. Further, there is an increased fluctuation of the back focusing with respect to the traveling distance of the first lens group. Accordingly, an excellent adjusting performance for the focal position can be obtained at an area up to several centimeters before the lens, using a smaller traveling distance.

17. The variable-power optical system of any one of Items 1 through 16, wherein the variable-power optical system adjusts a focal position from an object at an infinity distance to an object at a near distance by moving the third lens group or a lens group arranged at a closer position to an image side than the third lens group, toward the object side.

When this structure is used, the adjusting operation for the focal position is performed using the third lens group or the lens group located closer to the image than the third lens group, it does not cause an increase in the overall optical length due to a movement of lens groups or an increase in the diameter of the front lens. Thereby, a sharp image of an object at up to the near distance can be obtained. At the time of adjusting the focal position, optical specifications determines whether the first lens group should be moved, or the third lens group or the lens group located closer to the image than the third lens group should be moved. To be more specific, the first lens group is preferably moved when the close-up distance is to be minimized without sacrificing the close-up properties. When priority is placed on more compact configuration, the third lens group or the lens group located closer to the image than the third lens group is preferably moved.

18. The variable-power optical system of any one of Items 1 through 17, wherein the lenses made of a plastic material includes at least one lens formed with a material in which particles with a maximum size of 30 nm or less are dispersed into a plastic material.

Generally, when fine particles are mixed with a transparent resin material, light scattering will occur and the transmittance factor will be reduced. Thus, this is hardly used as an optical material. However, if the size of the fine particles is reduced below the wavelength of the transmitting light flux, scattering can be virtually blocked. The refractive index of a resin material is reduced with rise of temperature. However, the refractive index of inorganic particles, for example, rises with the rise of temperature. Thus, these temperature dependencies can be utilized in such a way that change in refractive index is not caused sufficiently by mutual offset of the dependencies. To put it more specifically, dispersion of particles having a maximum size of 30 nm or less into a resin material as the base material will produce a resin material characterized by extremely low temperature dependency of refractive index. For example, dispersion of niobium oxide ($Nb_2O_5$) into acrylic resin can reduce a change in refractive index resulting from temperature change. Thus, at least one lens in the variable-power optical system relating to the present invention is made of the resin material in which such particles are dispersed. This structure minimizes shift of back focus resulting from the environmental temperature change of all the systems in the variable-power optical system relating to the present invention.

19. An image pickup device, comprising: a variable-power optical system of any one of Items 1 through 18, and an image pickup element converting an optical image to electric signal, wherein the variable-power optical system is capable of forming an optical image of an object onto a light receiving surface of the image pickup element.

This structure provides a variable-power image pickup device with high-precision performance and extremely compact configuration that can be mounted on a mobile phone or a mobile information terminal.

20. A digital apparatus comprising the image pickup device described in Item 19, a controller for capturing at least one of a still image and a moving image, wherein a variable-power optical system in the image pickup device is mounted with being capable of forming an optical image of an object onto a light receiving surface of the image pickup element.

The aforementioned structures provide a digital apparatus provided with an image pickup device capable of varying the power with ensuring high-precision performances.

Advantageous Effects of Invention

The present invention provides a variable-power optical system of sufficiently compact configuration suitable for a high-pixel image pickup element and capable of reducing the load on a drive apparatus for varying power, wherein aberrations are sufficiently corrected over the entire variable-power region. This makes it possible to provide a variable-power optical system, and an image pickup device and digital apparatus with this variable-power optical system mounted thereon, which can be provided with reduced costs in sufficiently compact configuration.

BRIEF DESCRIPTION OF DRAWINGS

Each of FIGS. 2a and 2b is a schematic diagram representing the external view of a camera-equipped mobile phone carrying the variable-power optical system relating to the present invention; wherein.

REFERENCE SIGNS LIST

Figure 1:
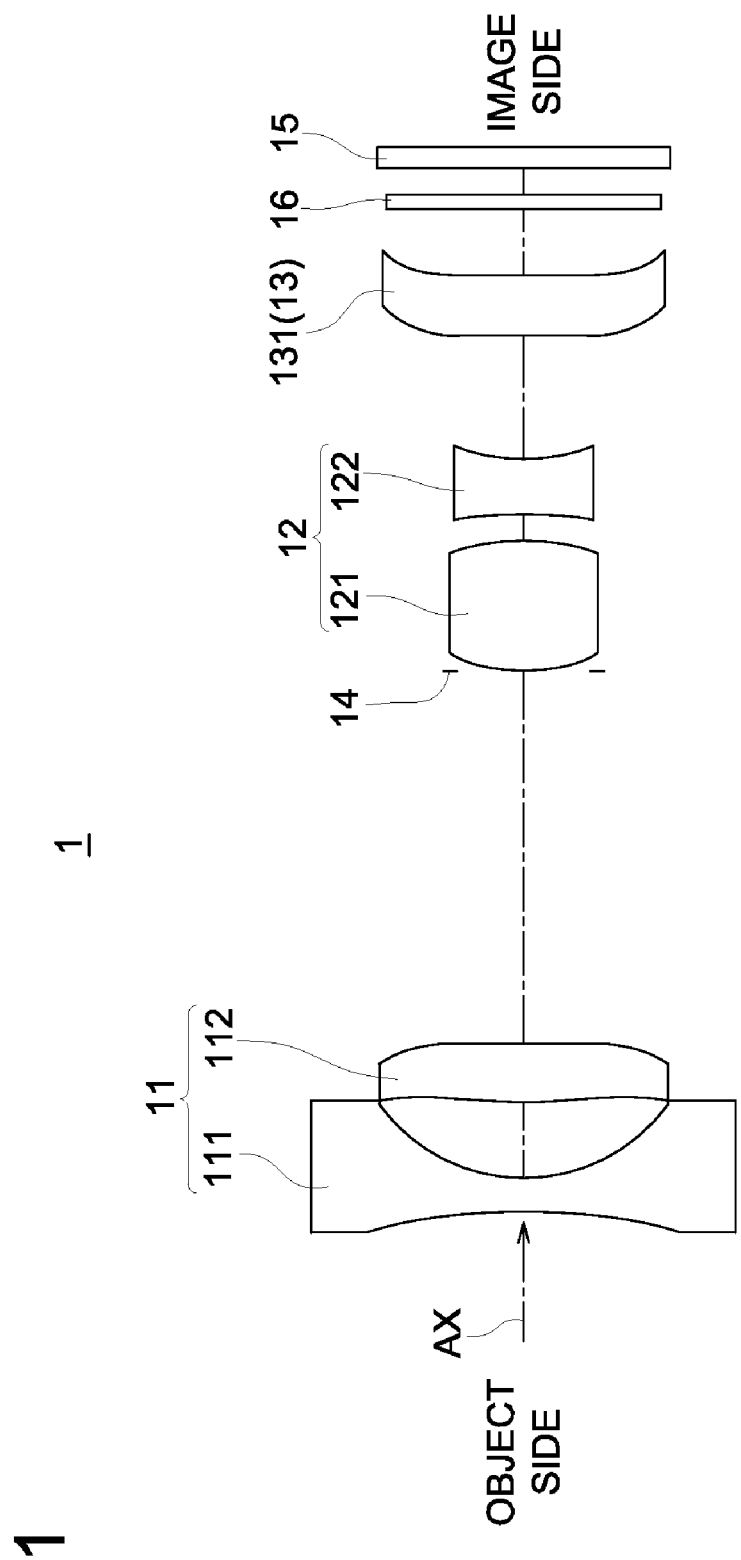
FIG. 1 is a diagram schematically representing the structure of a variable-power optical system relating to the present invention.

1, 1A through 1F Variable-power optical system
11, Gr1 First lens group
12, Gr2 Second lens group
13, Gr3 Third lens group
14, ST Optical stop
15, SR Image pickup element
AX Optical axis
2 Mobile phone (digital apparatus)
27 Image pickup device

BEST MODE FOR CARRYING OUT THE INVENTION

Referring to drawings, the following describes the embodiments of the present invention:

<Description of Variable-Power Optical System Structure>

FIG. 1 is an optical path diagram (an optical path diagram at the wide-angle end) representing the structure of a variable-power optical system 1 relating to the present invention. The variable-power optical system 1 forms an optical image of a subject on the light receiving surface (image plane) of an image pickup element 15 which converts an optical image into an electric signal, and includes a first lens group 11 with negative optical power, a second lens group 12 with positive optical power, and a third lens group 13 with positive optical power in that order as viewed from the object. In the variable-power optical system, the space between the first lens group 11 and second lens group 12 decreases when the power varies from the wide-angle end to the telephoto end. Here the third lens group 13 can have a negative optical power. The variable-power optical system 1 illustrated in FIG. 1 has the same structure as the variable-power optical system 1A (FIG. 4) of Example 1 to be described later.

In this case, the first lens group 11 is composed of a biconcave negative lens 111 and a biconvex positive lens 112. The second lens group 12 is composed of a biconvex positive lens 121 and a biconcave negative lens 122. The third lens group 13 is composed of a biconvex positive lens 131 alone. The negative lens 111, positive lens 112 and positive lens 131 are made of plastics. An optical stop 14 (aperture stop) is provided on the object side of the second lens group 12. An image pickup element 15 is arranged on the image side of the aforementioned variable-power optical system 1 through a low-pass filter 16. This arrangement allows an optical image of the subject on the object side to be led onto the light receiving surface of the image pickup element 15 along the optical axis AX at an appropriate variable-power ratio by the variable-power optical system 1. Then the optical image of the subject is captured by the image pickup element 15.

This variable-power optical system 1 is a three-component variable-power optical system with negative-positive-positive components, which is a negative-lead optical system wherein the first lens group 11 located closest to the object has negative optical power. Thus, the negative optical power of the first lens group 11 can quickly reduce the light entering thereto at a greater angle from the object side in terms of angle. This arrangement is advantageous for reducing the overall optical length and reducing the front lens diameter. Further, in the negative-lead configuration, an increase in the sensitivity to error can be suppressed even when a more compact configuration of the optical system is intended.

Further, the first lens group 11 is composed of a negative lens 111 and a positive lens 112. This arrangement ensures satisfactory correction of chromatic aberration of magnification and curvature of field. Thus, the power of the first lens group 11 can be increased while chromatic aberration of magnification and curvature of field are reduced by the first lens group 11, whereby the diameter of the front lens of the first lens group 11 is prevented from being increased. Further, plastic material is used to manufacture the negative lens 111 and positive lens 112 constituting the first lens group 11 wherein the outer diameter of the lens is greater than that in other lens groups. These plastic lenses reduce production costs and weight as compared with the case employing glass lenses.

In the illustrated example, one negative lens 111 and one positive lens 112 are included in the first lens group 11. However, a plurality of negative lenses and positive lenses can be contained. A prism that bends the optical axis AX at right angles, for example, can be included in the first lens group. However, the first lens group 11 is preferably made of four or less lenses including the prism. Particularly, the first lens group 11 is preferably made of two lenses. This arrangement reduces the weight of the lens group and the load on a drive apparatus at the time of varying power, and achieves a cost reduction by reducing the number of lenses. Further, the first lens group 11 is composed of two lenses made of a plastic material: negative lens 111 and positive lens 112. Even when there are employed plastic-made lenses providing a greater change in shape and refractive index due to temperature variations as compared to that in the glass, this structure cancels these adverse effects and minimizes the performance deterioration resulting from temperature variations.

The variable-power optical system 1 is provided with a third lens group 13, and is capable of sharing the load of the increased power of the zoom lens resulting from the compact configuration of the image pickup element 15. This arrangement reduces the power of the zoom system made up of the first and second lens groups 11, 12, whereby aberrations produced in each lens group is reduced, and excellent optical performances are ensured.

The variable-power optical system 1 satisfies the following conditional expressions (1) through (3), where f1 is a focal length of the first lens group 11, f2 is a focal length of the second lens group 12, fw is a composite focal length of the overall optical system at the wide-angle end, and $\beta 2t$ is an image-forming magnification of the second lens group 12 at the telephoto end:

$$0.5 < |f1/f2| < 1.4 \qquad (1)$$

$$0.5 < f2/fw < 2.0 \qquad (2)$$

$$-3.2 < \beta 2t < -1.4 \qquad (3)$$

If the conditional expressions (1) through (3) are satisfied, the variable-power optical system 1 exhibits an enhanced level of optical performances while reducing the sensitivity to manufacturing errors. If |f1/f2| is below the lower limit of the conditional expression (1), it is necessary to increase the power of the positive lens of the third lens group 13 (or the lens group at the closer position to the image than the third lens group 13) to a considerable level. Thus, sufficient back focusing is hardly ensured. In the meantime, if |f1/f2| exceeds the upper limit of the conditional expression (1), the traveling distance of the lens group at the time of varying power will be excessive. This will cause an increase in the overall length. If the f2/fw is below the lower limit of the conditional expression (2), the power of the second lens group 12 will be increased noticeably, and therefore, sufficient back focusing is hardly ensured. Not only that, the spherical aberration and comatic aberration is hardly corrected. In the meantime, if the f2/fw exceeds the upper limit of the conditional expression (2), the optical power of the second lens group 12 will be insufficient. This will cause an increase in the overall length. If the $\beta 2t$ is below the lower limit of the conditional expression (3), load of the second lens group 12 for the varying power will be increased, and satisfactory optical performances are hardly maintained. If the $\beta 2t$ exceeds the upper limit of the conditional expression (3), the traveling distance of the second lens group 12 as a moving lens group has to be increased in order to get a high level of variable-power ratio from the wide-angle end to the telephoto end. This will cause an increase in the overall length.

The relationship of the |f1/f2| in the conditional expression (1) preferably satisfies the following conditional expression (1)'.

$$1.0 < |f1/f2| < 1.4 \qquad (1)'$$

If the conditional expression (1)' is satisfied, the negative power of the first lens group 11 is weaker than the positive power of the second lens group 12, and negative distortion can be easily corrected.

The relationship of f2/fw of the conditional expression (2) preferably satisfies the following conditional expression (2)'.

$$1.2 < f2/fw < 1.8 \qquad (2)'$$

If the conditional expression (2)' is satisfied, the optical power of the second lens group 12 is insufficient, which causes a disadvantage for reducing the overall length. However, the sensitivity to manufacturing errors of the second lens group 12 as a moving lens group is reduced. Further, the optical power of the second lens group 12 is increased, which reduces the overall length.

The $\beta 2t$ of the conditional expression (3) preferably satisfies the following conditional expression (3)':

$$-2.3 < \beta 2t < -1.4 \qquad (3)'$$

If the conditional expression (3)' is satisfied, the second lens group 12 can be composed of two lenses. This arrangement reduces the number of lenses, and hence the production cost.

In the present invention, there is no particular restriction to the position of the optical stop 14 (aperture stop) to be arranged. As shown in FIG. 1, the optical stop 14 is preferably arranged on the object side of the second lens group 12, and the second lens group 12 and optical stop 14 preferably move as one integral unit when the power varies. This structure allows the optical stop 14 to move together with the second lens group 12 having the greatest traveling distance, and minimizes an increase in the effective outer diameter of the lens in the second lens group 12. Further, light on the image side is easily brought into a telecentric condition by third lens group 13 located closest to the image.

The following conditional expression (4) is preferably satisfied, assuming that Lsw is the distance from the aperture stop to the image surface at the wide-angle end, and Lw is the overall length of the variable-power optical system 1 at the wide-angle end, wherein the optical stop 14 is provided with the second lens group 12:

$$0.25 < Lsw/Lw < 0.70 \quad (4)$$

If the Lsw/Lw is below the lower limit of the conditional expression (4), the telecentricity at the wide-angle end is hardly maintained adequately. In the meantime, if the Lsw/Lw exceeds the upper limit of the conditional expression (4), the traveling distance of the lens group at the time of varying power will be reduced. This will require the optical power of the second lens group 12 to be increased to a considerably high level. This will entail manufacturing difficulties and noticeable tendency toward deterioration of optical performances.

As shown in FIG. 1, the second lens group 12 has a positive lens 121 on the object side, and the focal length of the positive lens 121 is assumed as f21. Then the following conditional expression (5) is preferably satisfied:

$$0.2 < f21/fw < 1.6 \quad (5)$$

If the f21/fw is below the lower limit of the conditional expression (5), there will be an excessive increase in a refraction angle of an off-axis principal ray emitted from the first lens group 11, and there will be noticeable generation of off-axis aberrations. In the meantime, if the f21/fw exceeds the upper limit of the conditional expression (5), it will be difficult to reduce off-axis aberrations to be generated.

The relationship of f21/fw of the conditional expression (5) preferably satisfies the following conditional expression (5)':

$$0.6 < f21/fw < 1.3 \quad (5)'$$

If the conditional expression (5)' is satisfied, longitudinal chromatic aberration is reduced. It reduces the number of lenses for correcting the aberration. Further, the overall length can be reduced because of the increased power of the second lens group 12.

As shown in FIG. 1, a lens having a negative optical power (negative lens 111) is arranged at the closest position to the object in the first lens group 11, and it is assumed that f11 denotes the focal length of the negative lens 111. In this case, the following conditional expression (6) is preferably satisfied:

$$-1.2 < f11/ft < -0.2 \quad (6)$$

If the f11/ft is below the lower limit of the conditional expression (6), the power of the negative lens 111 will be reduced and the diameter of the front lens of the first lens group 11 and overall length will be increased. In the meantime, if the f11/ft exceeds the upper limit of the conditional expression (6), the optical power of the negative lens 111 will be excessive and correction of aberrations will be difficult. For example, the negative distortion or the image surface curvature will be excessive.

The relationship of f11/ft of the conditional expression (6) preferably satisfies the following conditional expression (6)':

$$-1.2 < f11/ft < -0.2 \quad (6)'$$

If the conditional expression (6)' is satisfied, the Petzval's sum can be reduced sufficiently and an excellent image surface can be obtained. Further, loose manufacturing ease is ensured by the gradual curvature of the negative lens 111.

Abbe number $v1n$ of the negative lenses 111 of the first lens group 11, and Abbe number $v1p$ of the positive lens 112 preferably satisfy the following conditional expression (7):

$$10 < v1n - v1p < 35 \quad (7)$$

If the ($v1n-v1p$) is below the lower limit of the conditional expression (7), the chromatic aberration of magnification is hardly corrected in the first lens group. If the ($v1n-v1p$) exceeds the upper limit of the conditional expression (7), it will be difficult to obtain the plastic material with a property suitable in view of general versatility and optical properties. If the first lens group 11 contains a plurality of negative and positive lenses, the average value of the Abbe numbers applies to the conditional expression (7).

The relationship of the f11/ft in the conditional expression (7) preferably satisfies the following conditional expression (7)'.

$$23 < v1n - v1p < 30 \quad (7)'$$

If the conditional expression (7)' is satisfied, the chromatic aberration of magnification can be corrected sufficiently. The plastic material meeting this conditional expression provides stable properties free from any problem with hygroscopic property.

As shown in FIG. 1, a lens having a positive optical power (positive lens 112) is preferably arranged at the closest position to the image in the first lens group 11. The positive lens 112 generates aberrations having the sign reverse to those of the longitudinal chromatic aberration and chromatic aberration of magnification generated by the negative lens 111 of the first lens group 11. This allows the fluctuation of aberrations to be cancelled. Thus, the chromatic aberration can be reduced at the time of varying the power.

There is no particular restriction to the number of lenses in the second lens group 12. As illustrated in the variable-power optical system 1, the second lens group 12 is preferably composed of a biconvex positive lens 121 and biconcave negative lens 122, for example. In the second lens group 12, generally, the traveling distance is the longest at the time of varying the power. Thus, the second lens group 12 is made of only two lenses, whereby the weight and the load on the drive apparatus for varying power are reduced.

The focusing structure of the variable-power optical system 1 is preferably configured in such a way that the focal position is adjusted from an object at infinity to an object at a near distance by moving the first lens group 11 toward the object side. Since there are relatively small fluctuations in aberrations resulting from the traveling of the first lens group 11, deterioration of the performances caused by adjusting the focal position can be minimized. Further, since there is a substantial fluctuation in the back focusing with respect to the traveling distance of the first lens group 11, excellent focusing performances can be ensured in an area up to several centimeters before the lens by a shorter traveling distance.

The focusing structure of the variable-power optical system 1 may be configured in such a way that the focal position is adjusted from an object at infinity to an object at a near distance by moving the third lens group or the lens group located closer to the image than the third lens group, toward the object. It does not cause an increase in the overall optical length due to movement of lens groups or an increase in the diameter of the front lens. Thereby, a sharp image of an object at a near distance can be obtained. At the time of adjusting the focal position, optical specifications determines whether the first lens 11 group should be moved, or the third lens group 13 (or the lens group located closer to the image than the third lens group 13) should be moved. To be more specific, the first lens group is preferably moved when the close-up function is to be reinforced. When priority is placed on more compact configuration, the third lens group 13 is preferably moved.

In the variable-power optical system 1, each of the first lens group 11 and second lens group 12 is preferably provided with two or more aspheric surfaces. The first lens group 11 with aspheric surfaces mainly improves an effect of correcting astigmatism and distortion. The second lens group 12 with aspheric surfaces mainly improves an effect of correcting spherical aberration. If each of the first lens group 11 and second lens group 12 is provided with one aspherical surface, the same level of compact configuration is hardly obtained in the optical system using many glass lenses of a high refractive index. However, when each of them is provided with two or more aspheric surfaces, compact configuration can be achieved.

Among others, the biconvex positive lens 121 closest to the object in the second lens group 12 is preferably provided with at least one aspheric surface. This positive lens 121 is located at the highest position through which an on-axis ray passes. It mainly serves the function of correcting the spherical aberration and comatic aberration. The lens located at the highest position through which the on-axis ray passes means that the lens is arranged at the position where an aspheric surface exhibits the largest effect among the lenses constituting the second lens group 12. Accordingly, the positive lens 121 is preferably provided with an aspheric surface. The surface of the positive lens 121 facing the object is preferably formed into an aspheric surface having such a shape that the positive power becomes weaker on the periphery of the lens. This arrangement ensures effective correction of spherical aberration and comatic aberration.

Not only the first lens group 11 and second lens group 12, but also the other lens groups are preferably provided with an aspheric surface. Particularly, the lens surface in contact with air is preferably aspherical. To be more specific, all the biconcave negative lens 111, biconvex positive lens 112, biconvex positive lens 121, biconcave negative lens 122 and biconvex positive lens 131 on the object and image sides preferably have aspheric surfaces. This arrangement provides compatibility between extremely compact configuration and high image quality.

In the variable-power optical system 1, the exit pupil position at the wide-angle end is preferably arranged closer to the object than the light receiving surface of the image pickup element 15. This arrangement ensures an excellent angle of view and compact configuration of the variable-power optical system 1 at the same time.

FIG. 1 shows an example of the variable-power optical system 1 made up of three lens groups: first through third lens groups 11 through 13. It is also possible to add other lens groups. For example, a fourth lens group having a positive optical power can be provided on the image side of the third lens group 13. By arranging the fourth lens group, incident angle of an off-axis ray to the light-receiving surface of the image pickup element 15 is brought into a telecentric condition.

When the variable-power optical system is composed of three components, it is preferably composed of a first lens group made of a negative lens and a positive lens having a convex surface facing the object side, a second lens group made of a biconvex lens and a negative lens, and a third lens group made of a positive lens, in the order as viewed from the object side. When the first lens group is composed of a negative lens and a positive lens in that order, it is possible to configure a retro-focusing type wherein back focusing is easily secured at the wide-angle end. When the second lens group is composed of a positive lens and a negative lens in that order, the position of the principal point of the second lens group is put closer to the first lens group, and the substantial power of the second lens group can be reduced with the function for varying power kept unchanged, whereby the sensitivity to errors can be reduced. Further, by providing the third lens group as a positive lens, incident angle of an off-axis ray to the light-receiving surface of the image pickup element 15 is brought into a telecentric condition. Such requirements are met by the variable-power optical system 1 shown in FIG. 1. In the sense in which it is described here, the variable-power optical system 1 has a preferable configuration.

The following describes materials constituting the variable-power optical system 1: As described above, in the present embodiment, the negative lens 111 and biconvex positive lens 112 of the first lens group 11 are made of a plastic (resin) material. The optical materials consisting of various types of glass and plastic materials can be used for the lenses of the second lens group 12 and third lens group 13. Further, the first lens group 11 can include a glass-made lens, in addition to the negative lens 111 and biconvex positive lens 112. However, as compared with use of glass, use of a plastic material ensures reduced weight and permits high-volume production by injection molding and other methods, and reduces the production cost and the weight of the variable-power optical system 1. Thus, at least one glass lens is preferably contained in the lens groups other than the first lens group 11. It goes without saying that two or more resin-made lenses can be employed.

This lens made of resin is preferably made of a material obtained by dispersing particles with a maximum size of 30 nm or less—the inorganic particles in particular—in a resin material. Use of such a lens minimizes a change in refractive index resulting from temperature change in the lens made of resin material.

The following describes the details of the refractive index change due to temperature. The refractive index change A due to the temperature can be represented by the following expression (8) by dividing the refractive index n by temperature t, based on the Lorentz-Lorenz equation.

[Mathematical Formula 1]

$$A = \frac{(n^2+2)(n^2-1)}{6n}\left\{(-3\alpha) + \frac{1}{[R]}\frac{\partial [R]}{\partial t}\right\} \quad (8)$$

wherein $\alpha$ indicates a linear expansion coefficient, and [R] denotes molecular refraction.

For a plastic material, a contribution of the second term is smaller than that of the first term of the conditional expression (8), and can be almost ignored. For example, the linear expansion coefficient $\alpha$ of the PMMA resin is $7\times10^{-5}$. When this is substituted into the aforementioned expression, $A=-1.2\times10^{-4}$ [/°C.]. Approximate agreement with the actual measurement can be found. To put it more specifically, the refractive index change A due to the temperature of about $-1.2\times10^{-4}$ [/°C.] in the conventional art is preferably kept below $8\times10^{-5}$ [/°

C.] in terms of absolute value, more preferably below $6 \times 10^{-5}$ [/° C.] in terms of absolute value. If the change A due to the temperature is kept below $6 \times 10^{-5}$ [/° C.], a fluctuation of back focusing at the time of environmental temperature change can be reduced to about half. Table 1 shows the refractive index change A (=dn/dT) due the temperature of a plastic material applicable to the variable-power optical system 1.

TABLE 1

| Plastic material | A (approximate value) [$10^{-5}$/° C.] |
|---|---|
| Polyolefin | −11 |
| Polycarbonate | −14 |

Especially, the biconvex positive lens as a positive lens in the second lens group 12 preferably employs a molded lens formed with the material in which inorganic particles with a maximum size of 30 nm or less are dispersed into a plastic material. By employing a lens with small change in refractive index due to the temperature change for the positive lens in the second lens group, a change of image position due to the temperature change is cancelled out.

The variable-power optical system 1 can be provided with a mechanical shutter capable of cutting off light to the image pickup element 15, instead of the optical stop 14. Such a mechanical shutter is effective in preventing smear, when a CCD (Charge Coupled Device) or the like is employed, as the image pickup element 15.

The conventionally known cam mechanism and stepping motor can be used as a drive source for the lens groups, stop and shutter arranged on the variable-power optical system 1. Further, when there is not much traveling distance, or the driven group is less heavy, a piezoelectric actuator designed in a extremely compact configuration can be used. This actuator permits independent operation of each group while minimizing an increase in the volume of the drive section and power consumption. This arrangement provides a further compact configuration of the image pickup lens apparatus including the variable-power optical system 1.

In response to a light amount of an optical image of the subject whose image has been formed by the variable-power optical system 1, the image pickup element 15 photoelectrically converts it into image signal of each of red (R), green (G) and blue (B) components, and outputs the result into a predetermined image processing circuit. For example, the image pickup element 15 can use a single chip color area sensor, a so-called Bayer method, wherein the CCDs are arranged in a two-dimensional array and the color filters of red (R), green (G) and blue (B) are arranged in a checkered pattern on the surface of each CCD of the area sensor. In addition to such a CCD image sensor, a CMOS image sensor or VMIS image sensor can also be used.

The low-pass filter 16 is a parallel-flat optical component arranged on the light receiving surface of the image pickup element 15 to remove noise components. A birefringence type low-pass filter made of crystal or the like wherein a predetermined direction of crystal axis has been adjusted, or a phase type low-pass filter wherein the required optical cut-off frequency characteristics are implemented by diffraction effect is applicable to this low-pass filter 16. It should be noted that the low-pass filter 16 is not always required. Further, instead of the aforementioned optical low-pass filter 16, an infrared ray cut filter can be used to remove the noise included in the image signal of the image pickup element 15. Further, infrared reflection coating can be provided on the surface of the optical low-pass filter 16 so that both filter functions are performed by one arrangement.

<Description of Digital Apparatus Incorporating a Variable-power Optical System>

Figure 2A:
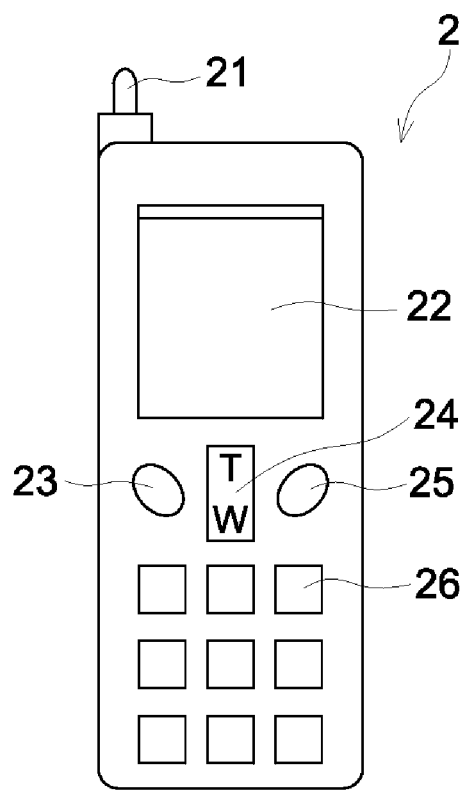
FIG. 2a is a schematic diagram representing the external view of the operation surface thereof.
Figure 2B:
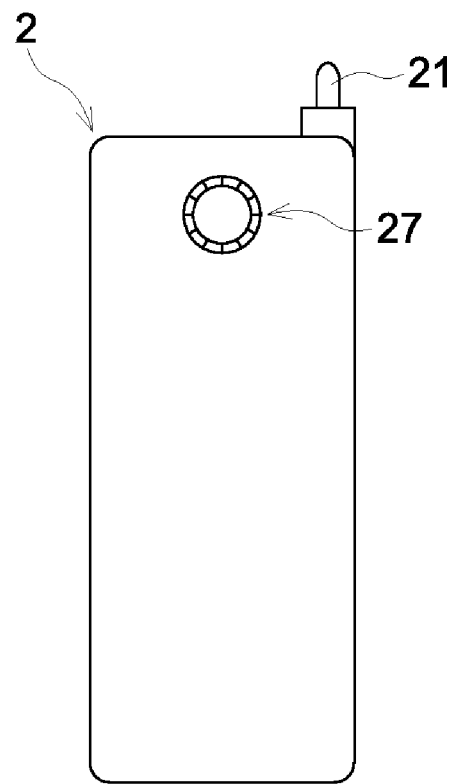
FIG. 2b is a schematic diagram representing the rear of the operation surface thereof.

The following describes a digital apparatus incorporating the aforementioned variable-power optical system 1. Each of FIGS. 2a and 2b is a schematic diagram representing an external view of a camera-equipped mobile phone as an embodiment of the digital apparatus of the present invention. In this invention, the digital apparatus includes a digital still camera, video camera, digital video unit, mobile information terminal (PDA (Personal Digital Assistant)), personal computer, mobile computer or the peripheral equipment thereof (mouse, scanner, printer, etc.).

FIG. 2a shows an operation surface of the mobile phone 2, and FIG. 2b shows a back side of the operation surface, i.e., a rear of the mobile phone. An antenna 21 is mounted on the top of the mobile phone 2. The operation side thereof is provided with a rectangle display 22, an image switching button 23 for starting an image pickup mode, and switching between a still image and moving image, and a zooming button 24 for controlling varying-power (zooming) operation, a shutter button 25, and a dial button 26. The zoom button 24 has a letter "T" standing for "telephoto" printed on the top end, and a letter "W" standing for "wide angle" printed on the bottom end, and includes a two-contact switch capable of instructing each varying-power operation when the printed position is depressed. Further, image pickup device 27 constituted by the above-described variable-power optical system 1 is mounted in the mobile phone 2.

Figure 3:
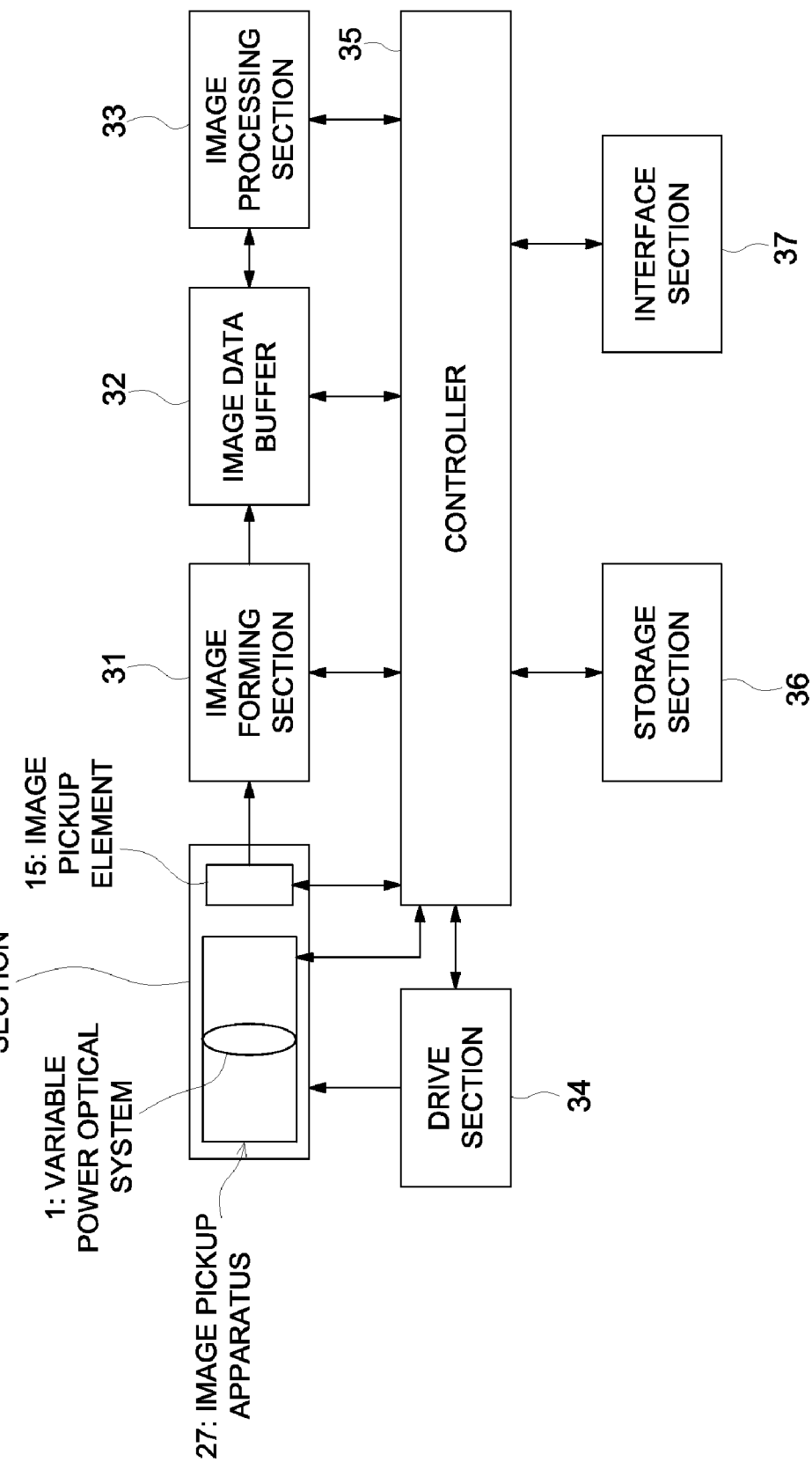
FIG. 3 is a functional block diagram showing the structure of the functional section of image pickup as an example of the digital apparatus equipped with the variable-power optical system relating to the present invention.

FIG. 3 is a functional block diagram showing an electrical functional structure related to an image-pickup operation of the mobile phone 2. To provide image-pickup functions, the mobile phone 2 includes an image pickup section 30, image generating section 31, image data buffer 32, image processing section 33, drive section 34, control section 35, storage section 36, and interface section 37.

The image pickup section 30 includes an image pickup device 27 and image pickup element 15. The image pickup device 27 is provided with a variable-power optical system 1 (illustrated in FIG. 1), and a lens drive apparatus (not illustrated) for varying the power and focusing by driving lenses in the direction of optical axis. Light from a subject forms an image on the light receiving surface of the image pickup element 15 by means of the variable-power optical system 1, and the optical image of the subject is generated.

The image pickup element 15 converts the optical image of the subject formed by the variable-power optical system 1, into electric signal (image signal) of each of color components, R (red), G (green) and B (blue). Each signal as the image signal of each of R, G and B colors is outputted to the image generating section 31. The image pickup element 15 controls such image pickup operations as capturing of either still or moving image, or reading the output signal of each image in the image pickup element 15 (horizontal synchronization, vertical synchronization and transfer) under the control of the control section 35.

The image generating section 31 applies processing of amplification and digital processing to the analog output signal from the image pickup element 15, and performs a conventionally known image processing such as determination of the adequate black level for the overall image, gamma correction, white balance adjustment (WB adjustment), contour correction and uneven color adjustment, whereby the image data of each image is generated from the image signal. The image data generated by the image generating section 31 is outputted to the image data buffer 32.

The image data buffer 32 stores image data on a temporary basis and constitutes a memory used as a work area wherein the processing (to be described later) is applied to this image data by the image processing section 33. It is made up, for example, of a RAM (Random Access Memory).

The image processing section 33 is a circuit that applies such image processing as resolution conversion to the image data of the image data buffer 32. If required, arrangement can be made to ensure that the image processing section 33 corrects the aberration that has not been corrected by the variable-power optical system 1.

The drive section 34 drives a plurality of lens groups of the variable-power optical system 1 so that desired varying power and focusing operations are performed by the control signal outputted from the control section 35.

The control section 35 is provided with a micro processor, for example, and controls the operations of the image pickup section 30, image generating section 31, image data buffer 32, image processing section 33, drive section 34, storage section 36 and interface section 37. To put it another way, the control section 35 provides control in such a way that at least one of the still and moving images of a subject will be captured by the image pickup device 27 and image pickup element 15.

The storage section 36 is a storage circuit for storing image data generated by a still or moving image of the subject, and is provided with a ROM (Read Only Memory) and RAM (Random Access Memory), for example. To be more specific, the storage section 36 performs the function of storing the still or moving image.

The interface section 37 is an interface for exchanging image data with an external equipment. It is an interface conforming to the USB or IEEE 1394 standards, for example.

The following describes an image pickup operation of the mobile phone 2 having the aforementioned configuration. To capture a still image, the image pickup mode is started by pressing the image switching button 23. In this case, the still image pickup mode is started by pressing the image switching button 23 once. If the image switching button 23 is pressed again in this state, the moving image pickup mode is selected. To be more specific, the control section 35 of the mobile phone 2 having received the instruction from the image switching button 23 allows the image pickup device 27 and image pickup element 15 to perform the operation of capturing at least one of the still and moving images of the subject on the object side.

When a still image pickup mode has started, the control section 35 provides control in such a way that the operation of capturing the still image is performed by the image pickup device 27 and image pickup element 15. At the same time, the lens drive apparatus (not illustrated) of the image pickup device 27 is driven to perform an operation of focusing. This procedure allows a well-focused optical image to be formed on the light receiving surface of the image pickup element 15 repeatedly on a predetermined cycle. After having been converted into image signal of each of R, G and B components, the signal is outputted to the image generating section 31. The image signal is stored in the image data buffer 32 on a temporary basis, and image processing is performed by the image processing section 33. After that, the signal is transferred to the display memory (not illustrated) and are led to the display 22. By watching the display 22, an operator is allowed to make adjustments in such a way that the subject will be located within a desired position on the screen. A still image can be obtained by pressing the shutter button 25 in this state. To be more specific, image data is stored in the storage section 36 as a memory of the still image.

In this case, to perform a zooming operation in order to capture the image of a subject located away from the operator or to enlarge the subject near the operator, the "T"-marked portion on the top end of the zooming button 24 is pressed. Then the current condition is detected. In response to the time of pressing the button, the control section 35 provides control to perform the lens drive operation for varying the power. Then zooming operation is performed by the variable-power optical system 1 on a continuous basis. When the magnification rate is to be reduced, for example, in the case of excessive zooming, the "W"-marked position on the bottom end of the zooming button 24 is pressed. Then the current condition is detected and the control section 35 controls the variable-power optical system 1, whereby zooming operation is performed on a continuous basis in conformance to the time of pressing. In the manner described above, the magnification rate for a subject located away from the operator can be adjusted using the zooming button 24. Similarly to the case of the normal operation of capturing a life-size image, adjustment is made so that the main subject is placed at a desired position on the screen, and the shutter button 25 is pressed. This procedure provides an enlarged still image.

To capture a moving image, the image switching button 23 is pressed once to start a still image pickup mode. Then the image switching button 23 is pressed again to select the moving image pickup mode. This procedure allows the control section 35 to control the image pickup device 27 and image pickup element 15 to capture a moving image. After that, similar to the case of the operations for capturing a still image, the operator watches the display 22 and makes adjustments to ensure that the image of the subject gained through the image pickup device 27 is located at a desired position on the screen. Here, similar to the case of the operations for capturing a still image, the magnification rate of the subject can be adjusted using the zooming button 24. The shutter button 25 is pressed in this state. This starts the operation of capturing a moving image. The magnification rate of the subject can be changed as desired during image pickup operation by pressing the zoom button 24.

While a moving image is captured, the control section 35 allows the image pickup device 27 and image pickup element 15 to capture the moving image. At the same time, the control section 35 drives the lens drive apparatus (not illustrated) of the image pickup device 27 so that the focusing operation is performed. This procedure allows a well-focused optical image to be formed on the light receiving surface of the image pickup element 15 repeatedly on a predetermined cycle. After having been converted into image signal of each of R, G and B components, each signal is outputted to the image generating section 31. Each image signal is stored in the image data buffer 32 on a temporary basis, and image processing is performed by the image processing section 33. After that, these signals are transferred to the display memory and are led to the display 22. When the shutter button 25 is pressed again, the moving image pickup operation terminates. The moving image having been captured is led to the storage section 36 as a moving image memory, and is stored therein.

<Description of a More Specific Embodiment of the Variable-power Optical System>

Referring to the drawings, the following describes the variable-power optical system 1 of FIG. 1, i.e., the variable-power optical system 1 constituting the image pickup device 27 mounted on the mobile phone 2 of FIGS. 2a and 2b.

EXAMPLES

Example 1

Figure 4:
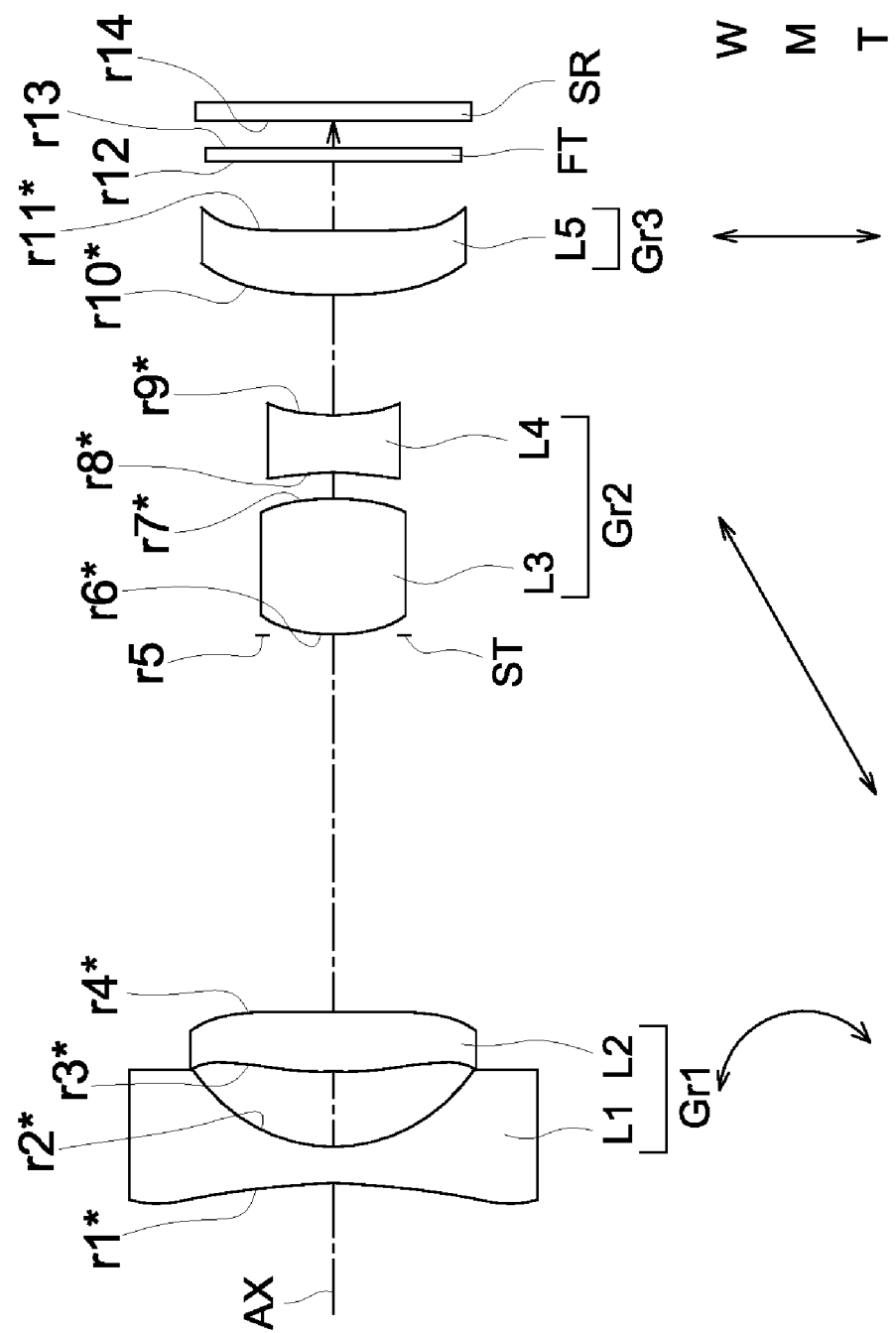
FIG. 4 is a cross sectional view showing the optical path at the wide-angle end of the variable-power optical system relating to Example 1 of the present invention.

FIG. 4 is a cross sectional view (optical path diagram) traversing the optical axis AX, representing the arrangement of lens groups in the variable-power optical system 1 of Example 1. The optical path diagrams of FIG. 4 and FIG. 5 through 9 show the lens arrangement at the wide-angle end (W). Lens groups in Example 1 include a first lens group (Gr1) having a negative optical power as a whole, a second lens group (Gr2) having a positive optical power, and a third lens group (Gr3) having a positive optical power, in that order as viewed from the object side in the drawings (the left side in FIG. 4). To put it another way, the lens groups are aligned in a negative-lead configuration wherein the first lens (Gr1) closest to the object has a negative optical power. This configuration also applies to the Examples 2 through 6 to be described later.

Specifically, the lens groups are configured in the following order as viewed from the object side in the variable-power optical system 1A of Example 1: The first lens group (Gr1) is composed of a biconcave negative lens (first lens L1) and a biconvex positive lens (second lens L2). The second lens group (Gr2) is composed of a biconvex positive lens (third lens L3) and a biconcave negative lens (fourth lens L4). The object side of this second lens group (Gr2) is provided with an optical stop (ST) that moves together with the second lens group (Gr2) at the time of varying the power. The third lens group (Gr3) is composed of one biconvex positive lens (fifth lens L5). The light-receiving surface of an image pickup element (SR) is provided on the image side of this third lens group (Gr3) through the parallel flat plate (FT). The parallel flat plate (FT) corresponds to an optical low-pass filter, infrared cutoff filter or image pickup element cover glass. Instead of the aforementioned optical stop (ST), a mechanical shutter can be arranged. (This description is also applicable to Examples 2 through 6).

The number ri (i=1, 2, 3, . . . ) labeled to the lens surfaces in FIG. 4 indicates i-th lens when counted from the object side (wherein a cemented lens surface is counted as one surface). The surface showing "ri" followed by "*" is an aspheric surface. Each of the aforementioned optical stops (ST), both surfaces of the parallel flat plate (FT) and the light receiving surface of the image pickup element (SR) are treated as constituting one surface. This method of handling is also applicable to the optical power diagrams (FIGS. 5 through 9) for the other examples to be described later. The reference numerals of the diagram have basically the same references as those of FIG. 4. However, this does not mean that they are strictly identical. For example, throughout the diagrams, the lens surfaces closest to the object have the same number (r1), but this does not mean that these curvatures are the same throughout the embodiments.

In the aforementioned configuration, light coming from the object side travels along the optical axis AX to pass throughout the first lens group, second lens group, third lens group and third lens group (Gr1, Gr2, and Gr3) and parallel flat plate (FT). Then the optical image of an object is formed on the light-receiving surface of the image pickup element (SR). In the image pickup element (SR), the optical image corrected by the parallel flat plate (FT) is converted into the electric signal. This electric signal is subjected to predetermined digital image processing and image compression processing, as required, and is recorded in the memory of a mobile phone or mobile information terminal as a digital video signal, which is then transmitted to other digital equipment by wired or wireless means.

The lower portion of FIG. 4 (as well as FIGS. 5 through 9) indicates traveling directions of these lens groups at the time of varying the power. In the drawings, the reference letter W indicates the wide-angle end exhibiting the minimum focal length and the maximum angle of view. The reference letter T denotes the telephoto end exhibiting the maximum focal length and the minimum angle of view. The reference letter M shows that the focal length is intermediate between the wide-angle end (W) and telephoto end (T). The actual lens groups travel on a straight line along the optical axis. In this diagram, the positions of the lens groups at the wide-angle end (W), intermediate point (M) and telephoto end (T) are arranged from top to bottom in the diagram.

As shown in FIG. 4, in Example 1, the first lens group (Gr1) and second lens group (Gr2) are movable for varying the power, and the third lens group (Gr3) is fixed at the time of varying the power. To put it more specifically, at the time of varying the power from the wide-angle end (W) to the telephoto end (T), the first lens group (Gr1) moves to form a convex locus projecting to the image side, and the second lens group (Gr2) lineally moves in the direction of coming closer to the object. In this example as well as the following examples, the traveling direction and distance of these lens groups may change according to the optical power and configuration of the lens groups. For example, the second lens group (Gr2) is illustrated as linearly moving in FIG. 4. It can include the cases wherein the lens group moves to form a convex curve projecting to the object side or image side, as well as the cases wherein it moves along a U-turn shape.

Tables 2 and 3 show the construction data of each lens in the variable-power optical system 1A of Example 1. In this variable-power optical system 1A, all the lenses (L1 through L5) are designed as lenses with double aspheric surfaces. Further, the first, second and fifth lenses (L1, L2 and L5) are plastic lenses, and the third and fourth lenses (L3 and L4) are glass lenses. Table 16 (to be given later) shows the relevant numerals when the aforementioned conditional expressions (1) through (7) are applied to the optical system 1A of Example 1.

TABLE 2

| Lens surface | Curvature radius (mm) | On-axis distance between surfaces (mm) | | | Refractive index | Abbe number |
|---|---|---|---|---|---|---|
| | | W | M | T | | |
| r1* | −17.308 | 0.600 | | | 1.53048 | 55.72 |
| r2* | 3.302 | 1.628 | | | | |
| r3* | 9.740 | 1.297 | | | 1.58340 | 30.23 |
| r4* | −711.894 | 8.213 | 2.765 | 0.900 | | |
| r5 (Stop) | ∞ | 0.000 | | | | |
| r6* | 3.445 | 2.937 | | | 1.58913 | 61.24 |
| r7* | −4.211 | 0.555 | | | | |
| r8* | −7.737 | 1.245 | | | 1.80542 | 26.12 |
| r9* | 5.366 | 2.594 | 5.975 | 9.144 | | |
| r10* | 13.711 | 1.424 | | | 1.58340 | 30.23 |
| r11* | −35.050 | 1.468 | | | | |
| r12 | ∞ | 0.300 | | | 1.51680 | 64.20 |
| r13 | ∞ | 0.540 | | | | |
| r14 (Image plane) | ∞ | | | | | |

TABLE 3

| Lens surface | Conic constant k | Aspheric surface coefficient | | | | | |
|---|---|---|---|---|---|---|---|
| | | A | B | C | D | E | F |
| r1 | 0 | −1.86E−03 | 3.37E−04 | −1.61E−05 | −2.76E−07 | 4.51E−08 | −9.37E−10 |
| r2 | 0 | −5.83E−03 | −8.80E−05 | 1.09E−04 | −1.64E−05 | 6.26E−07 | −1.13E−08 |
| r3 | 0 | −1.91E−03 | −4.45E−04 | 3.88E−05 | 4.50E−06 | −1.05E−06 | 4.37E−08 |
| r4 | 0 | −1.66E−03 | −5.02E−04 | 8.43E−05 | −6.47E−06 | 5.94E−08 | 6.29E−09 |
| r6 | 0 | −2.05E−03 | −1.50E−03 | 1.82E−03 | −1.22E−03 | 3.78E−04 | −4.45E−05 |
| r7 | 0 | 8.81E−03 | −8.32E−04 | −3.00E−04 | 1.61E−05 | 4.68E−05 | −8.18E−06 |
| r8 | 0 | 4.97E−03 | −2.07E−03 | 1.41E−03 | −1.18E−03 | 4.72E−04 | −5.54E−05 |
| r9 | 0 | 5.50E−03 | −2.14E−04 | 1.74E−03 | −1.17E−03 | 3.28E−04 | −6.91E−06 |
| r10 | 0 | 5.23E−03 | −1.39E−03 | 4.25E−04 | −5.61E−05 | 3.48E−06 | −7.89E−08 |
| r11 | 0 | 9.70E−03 | −2.51E−03 | 5.54E−04 | −3.79E−05 | −9.94E−07 | 1.61E−07 |

Table 2 shows the number of each lens surface; curvature radius of each surface (in terms of mm); distances on the optical axis between lens surfaces (on-axis distance between surfaces in terms of mm) when the focal position is adjusted to the infinity, at the wide-angle end (W), intermediate point (M) and telephoto end (T); refractive index of each lens, and Abbe number, in that order as viewed from the left. The blank field of the on-axis distance between surfaces M and T shows the same value as that in the "W" column. Further, the on-axis distance between surfaces indicates the distance calculated on the assumption that air is present as a medium in the area between a pair of opposed surfaces. Here, the numbers ri (i=1, 2, 3, . . . ) labeled to the lens surfaces indicates i-th optical surface when counted from the object side on the optical path, as shown in FIG. 4. The surface with "ri" affixed with "*" is an aspheric surface (i.e., a refractive optical surface in an aspheric shape or a surface with a refractive action equivalent to an aspheric surface). The optical stop (ST), both surfaces of the parallel flat plate (FT) and the light-receiving surface of the image pickup element (SR) are flat and the radius thereof is infinite.

An aspheric shape of an optical surface can be defined by the following formula (9) using the local orthogonal coordinates (x, y and z) wherein the tip of the surface is an origin, and the direction from the object to the image pickup element is the positive direction on the z-axis.

[Mathematical Formula 2]

$$Z = \frac{ch^2}{1 + SQRT\{1 - (1+k)c^2h^2\}} + Ah^4 + Bh^6 + Ch^8 + Dh^{10} + Eh^{12} + Fh^{14} + Gh^{16} \quad (9)$$

In the expression, z is the amount of displacement in the z-axis direction at height h (measured from the surface tip), h is the height perpendicular to the z axis ($h^2=x^2+y^2$), c is a paraxial curvature (=1/curvature radius), A, B, C, D, E, F and G are the fourth, sixth, tenth, twelfth, fourteenth and sixteenth order aspheric surface coefficients, respectively, and k is a conic constant.

As will be apparent from the formula (9), a curvature radius for an aspheric surface of Table 2 shows a value at a position around the tip of the lens surface. Table 3 shows conic constant k of a surface defined as an aspheric surface (a surface labeled "ri" affixed with "*" in Table 2), and values for aspherical surface coefficients A, B, C, D, E and F.

Figure 10:
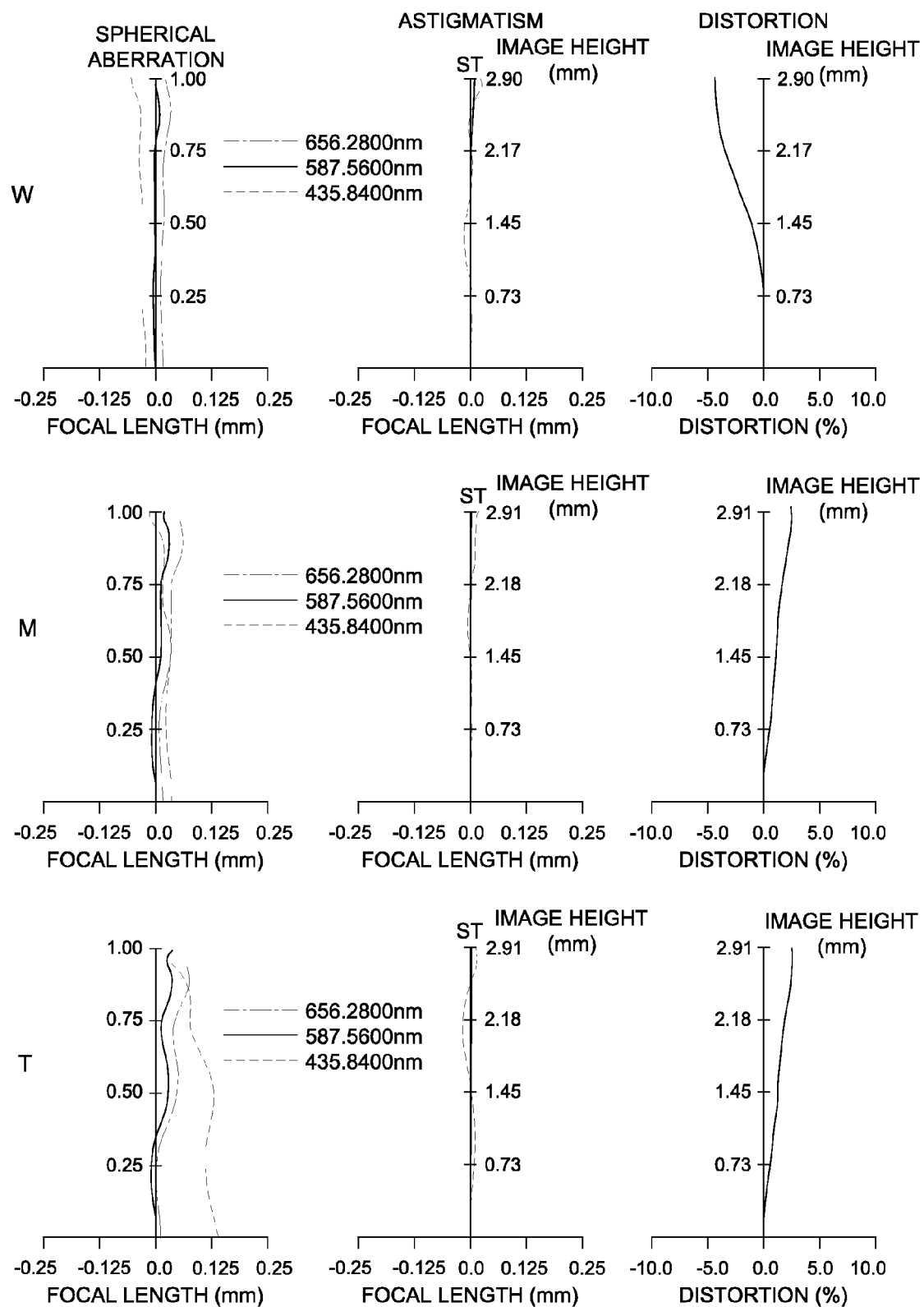
FIG. 10 is an aberration diagram representing the spherical aberration, astigmatism and distortion of lens groups in Example 1.
Figure 11:
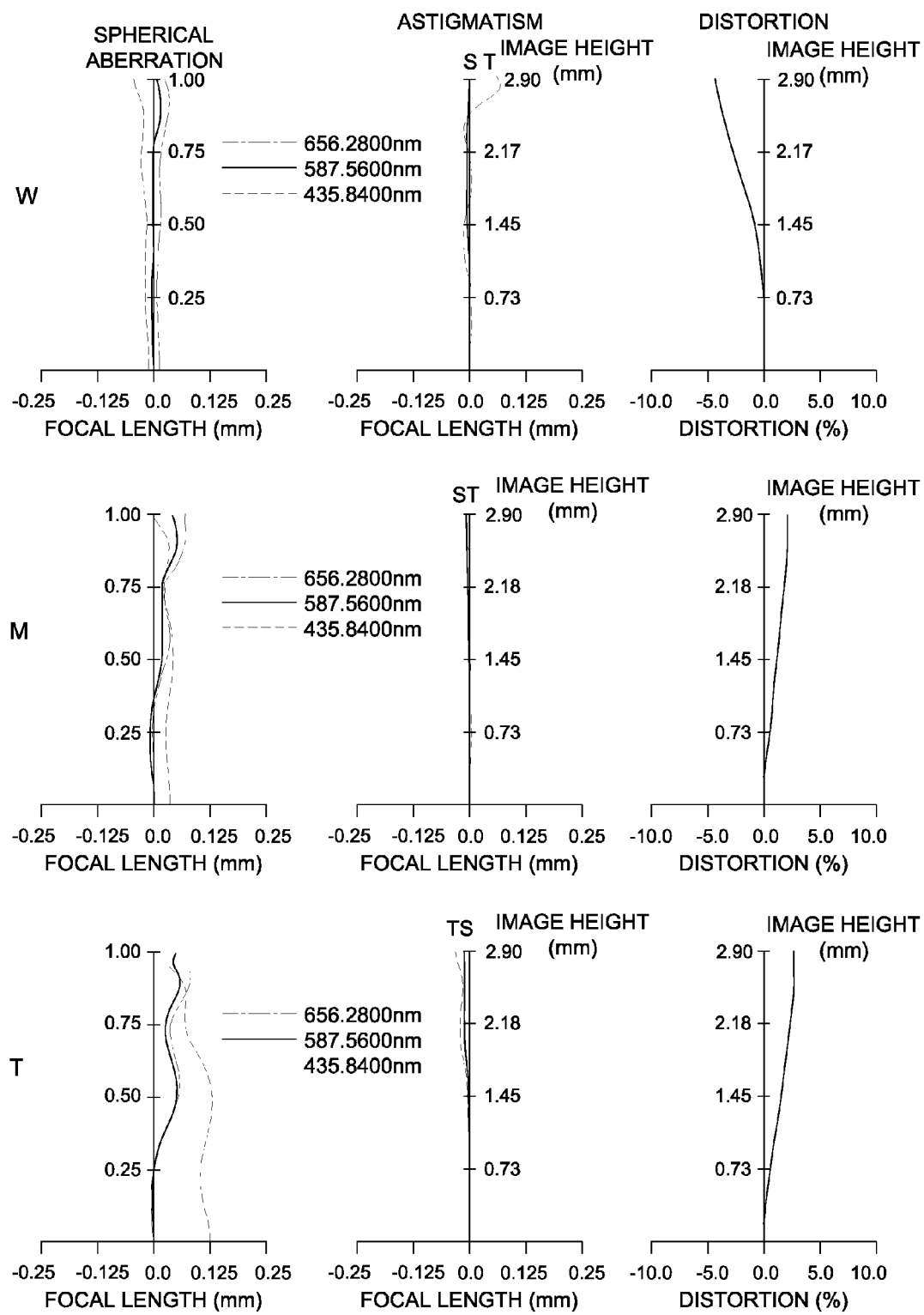
FIG. 11 is an aberration diagram representing the spherical aberration, astigmatism and distortion of lens groups in Example 2.
Figure 12:
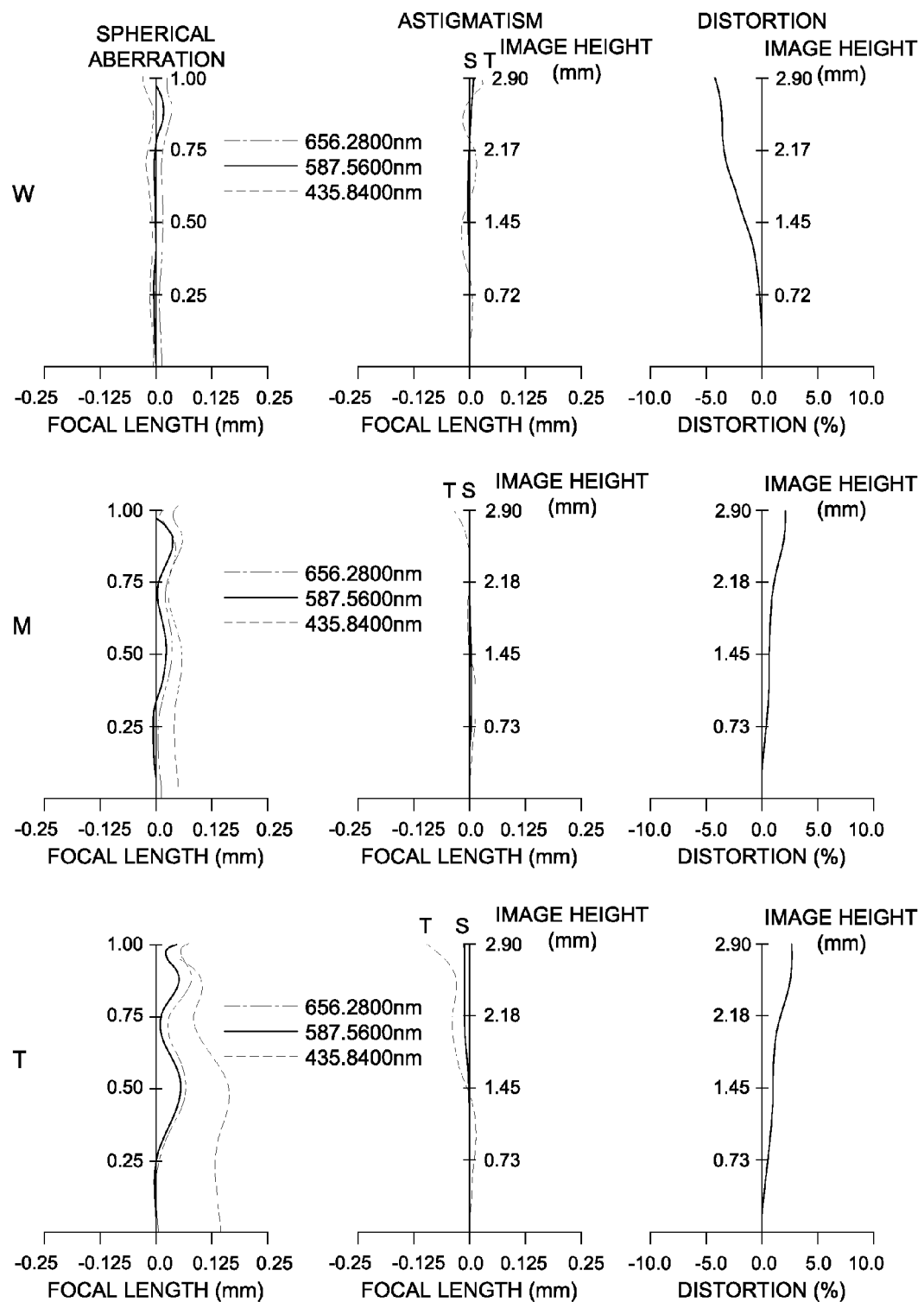
FIG. 12 is an aberration diagram representing the spherical aberration, astigmatism and distortion of lens groups in Example 3.
Figure 13:
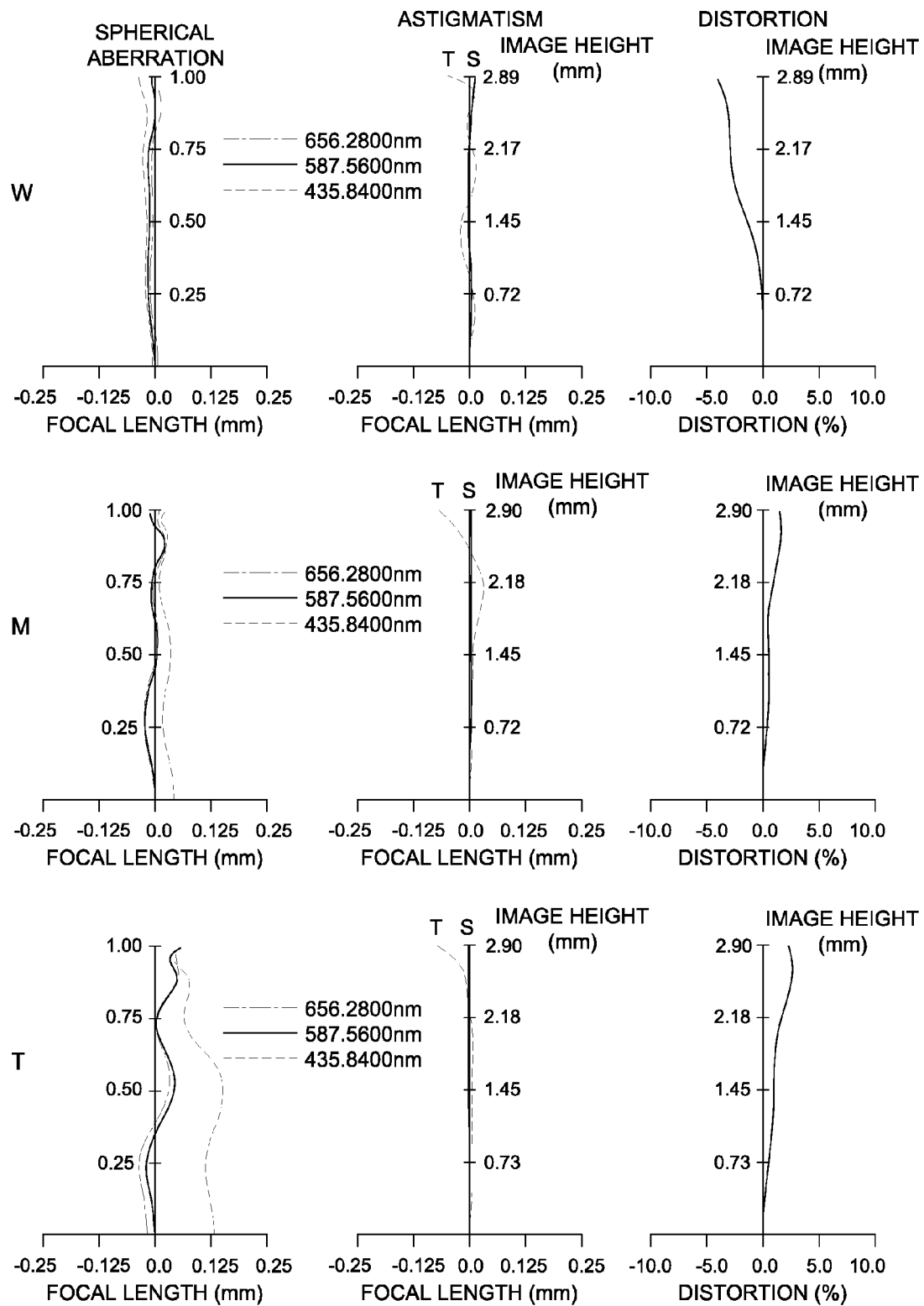
FIG. 13 is an aberration diagram representing the spherical aberration, astigmatism and distortion of lens groups in Example 4.
Figure 14:
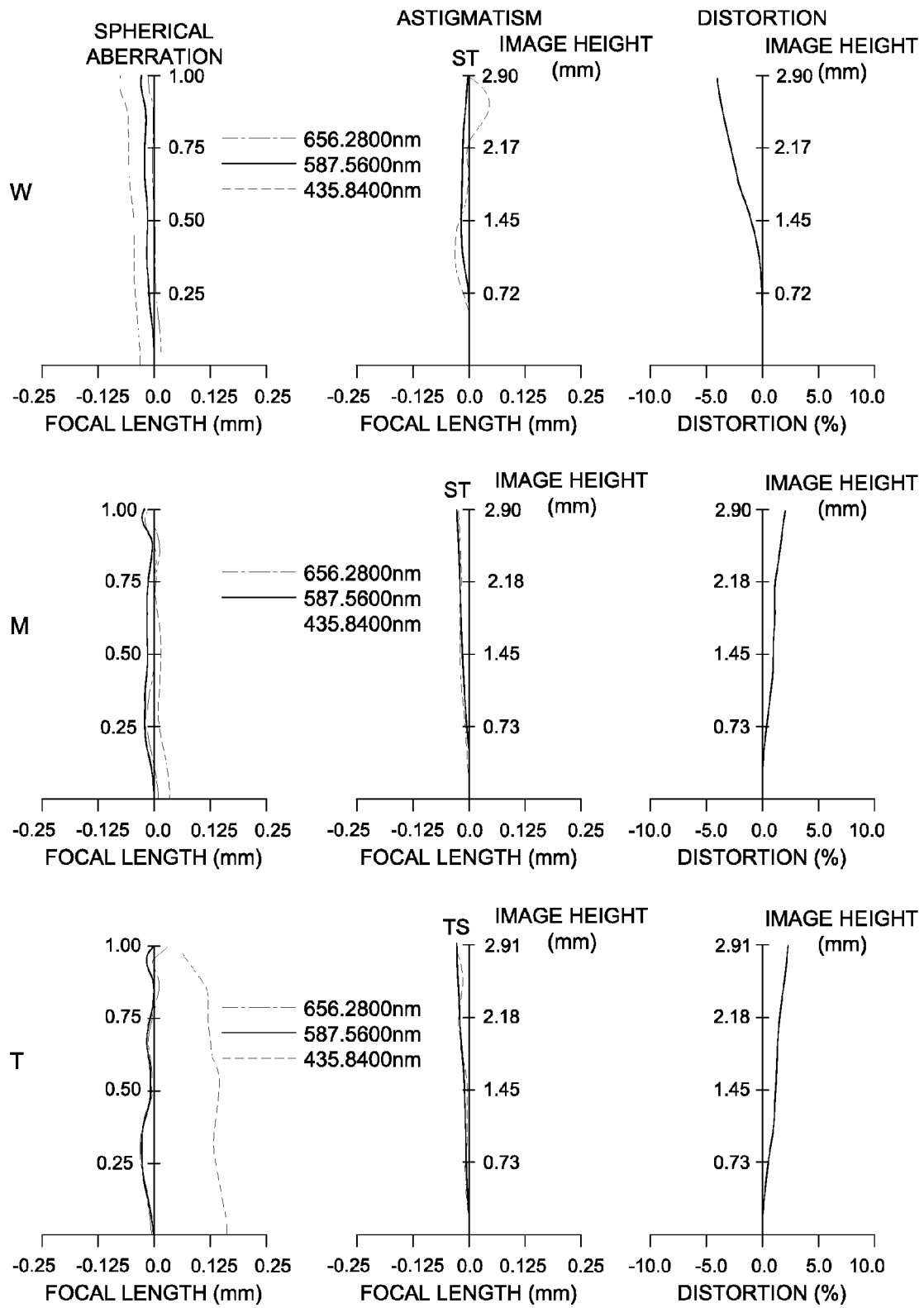
FIG. 14 is an aberration diagram representing the spherical aberration, astigmatism and distortion of lens groups in Example 5.
Figure 15:
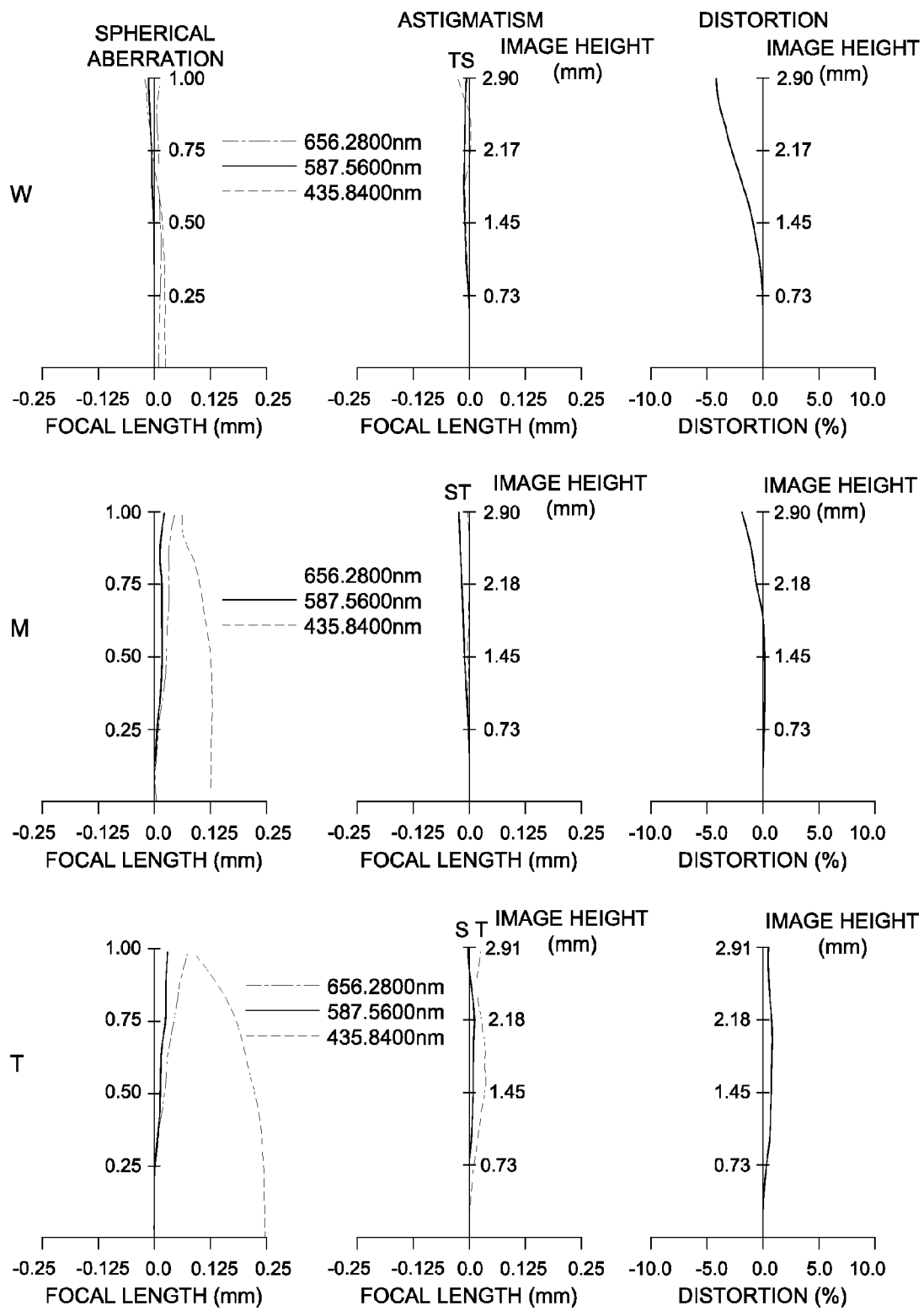
FIG. 15 is an aberration diagram representing the spherical aberration, astigmatism and distortion of lens groups in Example 6.

FIG. 10 shows spherical aberration (LONGITUDINAL SPHERICAL ABERRATION), astigmatism (ASTIGMATISM) and distortion (DISTORTION) of the entire optical system in Example 1 in that order as viewed from the left, based on the aforementioned lens arrangement and configuration. In this diagram, the upper level shows aberrations at the wide-angle end (W), the intermediate level shows aberrations at the intermediate point (M), and the lower level shows aberrations at the telephoto end (T). The horizontal axis for the spherical aberration and astigmatism indicates the shift of the focal position in terms of "mm", and the horizontal axis for distortion shows the amount of distortion in terms of percentage with respect to the total amount. The vertical axis for the spherical aberration represents a value normalized with respect to the height of incidence. The vertical axis for astigmatism and distortion shows the values in terms of the image height (in mm).

In the diagram illustrating the spherical aberration, aberrations at the time of using three beams of light having different wavelengths are shown: the one-dot chain line indicates a red color (with a wavelength of 656.28 nm), the solid line denotes a yellow color (so-called d-line with a wavelength of 587.56 nm), and the broken line represents a blue color (with a wavelength of 435.84 nm). In the astigmatism diagram, reference letters s and t indicate the results on the sagittal (radial) surface and tangential (meridional) surface, respectively. Further, the astigmatism and distortion diagram show the results of using the aforementioned yellow line (d-line). As will be apparent, FIG. 10 suggests excellent optical characteristics wherein the distortion of the lens groups in Example 1 is kept at 5% or less at any of the wide-angle end (W), intermediate point (M) and telephoto end (T). Tables 14 and 15 show the focal length (in mm) and F value at the wide-angle end (W), intermediate point (M) and telephoto end (T) in Example 1, respectively. These Tables demonstrate that an optical system with a short focal length and excellent performance in terms of speed is realized in the present invention.

Example 2

Figure 5:
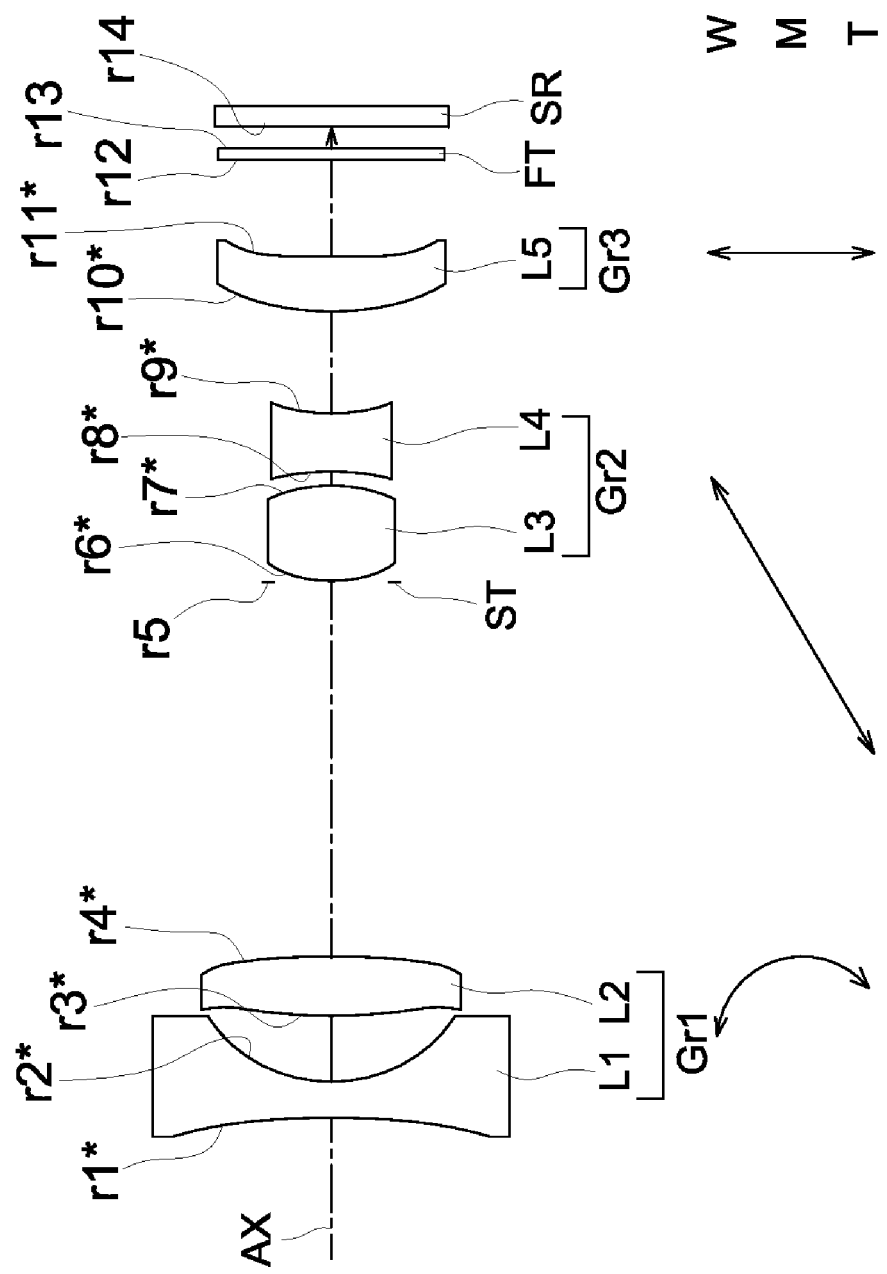
FIG. 5 is a cross sectional view showing the optical path at the wide-angle end of the variable-power optical system relating to Example 2.

FIG. 5 is a cross sectional view traversing the optical axis (AX), representing the arrangement of lens groups in the variable-power optical system 1B in Example 2. The variable-power optical system 1B in Example 2 includes a first lens group (Gr1) having a negative optical power as a whole, an optical stop (ST), a second lens group (Gr2) having a positive optical power as a whole, and a third lens group (Gr3) having a positive optical power, in that order as viewed from the object side. To put it in more detail, the first lens group (Gr1) is composed of a biconcave negative lens (L1) and a biconvex positive lens (L2), in that order as viewed from the object side. The second lens group (Gr2) is composed of a biconvex positive lens (L3) and a biconcave negative lens (L4) arranged in that order as viewed from the object side. The third lens group (Gr3) is composed of one positive meniscus lens (L5) with a convex surface facing the object side.

In the variable-power optical system 1B with the above lens configuration in the Example 2, at the time of varying the power from the wide-angle end (W) to the telephoto end (T), the first lens group (Gr1) moves to form a convex locus projecting to the image side and the second lens group (Gr2) linearly moves toward the object, as shown in the bottom of FIG. 5. The third lens group (Gr3) is statically positioned. The optical stop (ST) travels together with the second lens group (Gr2) at the time of varying the power.

Tables 4 and 5 show the construction data of each lens in the variable-power optical system 1B in Example 2. As shown in these Tables and FIG. 5, all the lenses (L1 through L5) are designed as lenses with double aspheric surfaces in Example 2. The first, second, third, and fifth lenses (L1, L2, L3, and L5) are plastic lenses and the fourth lens (L4) is a glass lens.

TABLE 4

| Lens surface | Curvature radius (mm) | On-axis distance between surfaces (mm) | | | Refractive index | Abbe number |
|---|---|---|---|---|---|---|
| | | W | M | T | | |
| r1* | −14.169 | 0.800 | | | 1.53048 | 55.72 |
| r2* | 3.402 | 1.646 | | | | |
| r3* | 9.740 | 1.430 | | | 1.58340 | 30.23 |
| r4* | −76.843 | 9.219 | 3.033 | 0.901 | | |
| r5 (Stop) | ∞ | 0.000 | | | | |
| r6* | 3.023 | 2.368 | | | 1.53048 | 55.72 |
| r7* | −3.666 | 0.329 | | | | |
| r8* | −6.703 | 1.463 | | | 1.80542 | 26.12 |
| r9* | 5.672 | 2.510 | 6.159 | 9.588 | | |
| r10* | 11.301 | 1.347 | | | 1.58340 | 30.23 |
| r11* | 179.687 | 2.365 | | | | |
| r12 | ∞ | 0.300 | | | 1.51680 | 64.20 |
| r13 | ∞ | 0.540 | | | | |
| r14 (Image plane) | ∞ | | | | | |

TABLE 5

| Lens surface | Conic constant k | Aspheric surface coefficient | | | | | |
|---|---|---|---|---|---|---|---|
| | | A | B | C | D | E | F |
| r1 | 0 | −1.34E−03 | 3.04E−04 | −1.58E−05 | −2.04E−07 | 4.16E−08 | −8.89E−10 |
| r2 | 0 | −5.94E−03 | −8.80E−05 | 1.23E−04 | −1.73E−05 | 6.06E−07 | −5.66E−09 |
| r3 | 0 | −1.92E−03 | −3.98E−04 | 4.43E−05 | 4.47E−06 | −9.94E−07 | 3.82E−08 |
| r4 | 0 | −1.25E−03 | −5.06E−04 | 9.02E−05 | −6.34E−06 | 5.21E−08 | 4.68E−09 |
| r6 | 0 | −2.45E−03 | −1.67E−03 | 1.85E−03 | −1.23E−03 | 3.67E−04 | −4.17E−05 |
| r7 | 0 | 1.18E−02 | −5.49E−04 | −4.37E−04 | 3.16E−05 | 4.01E−05 | −7.46E−06 |
| r8 | 0 | 4.02E−03 | −5.31E−04 | 1.42E−03 | −1.32E−03 | 4.79E−04 | −5.54E−05 |
| r9 | 0 | 4.51E−03 | 1.24E−03 | 1.58E−03 | −1.18E−03 | 3.28E−04 | −6.91E−06 |
| r10 | 0 | 6.71E−03 | −1.49E−03 | 3.86E−04 | −5.23E−05 | 3.41E−06 | −8.00E−08 |
| r11 | 0 | 1.04E−02 | −2.06E−03 | 4.45E−04 | −4.18E−05 | 5.49E−07 | 9.29E−08 |

Example 3

Figure 6:
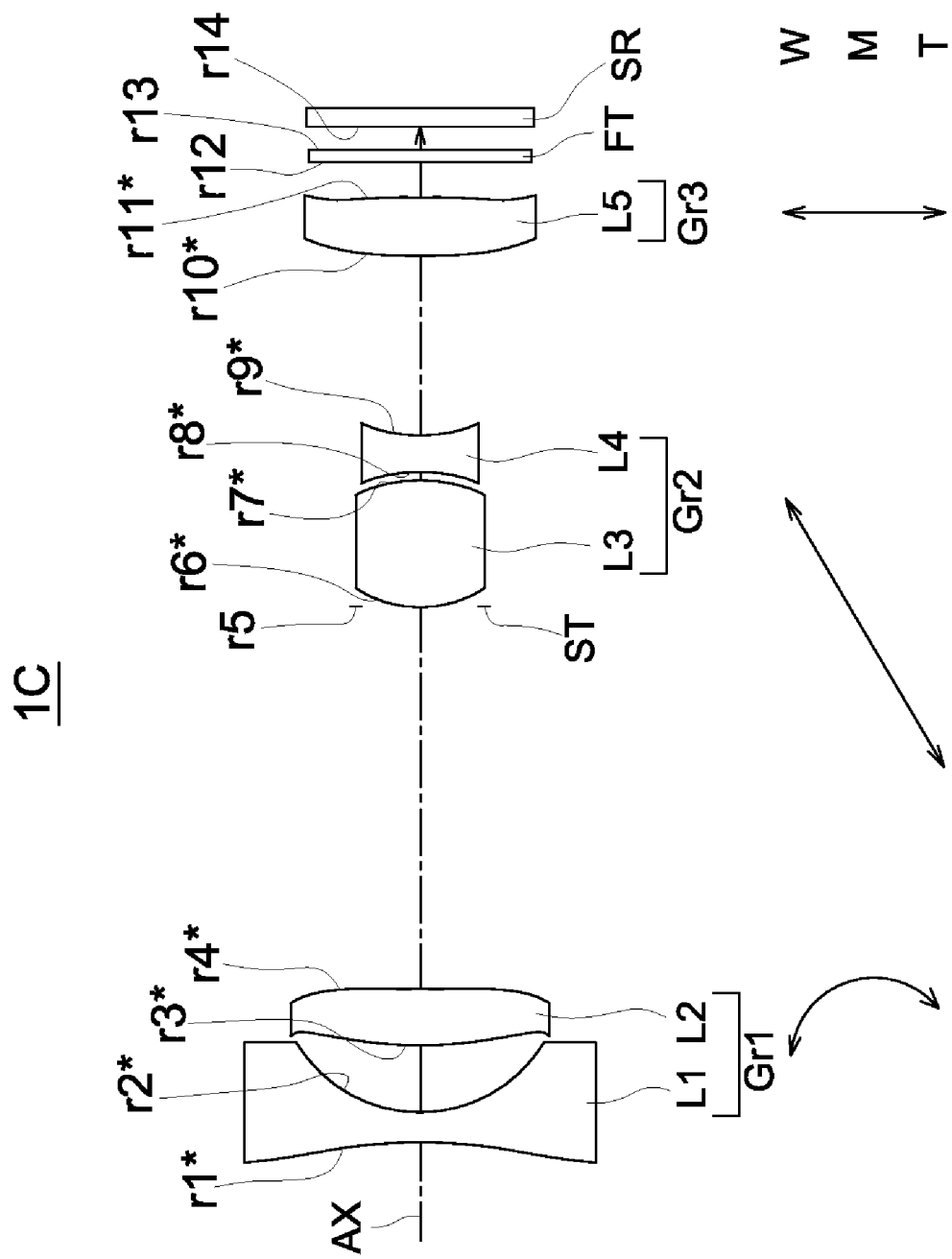
FIG. 6 is a cross sectional view showing the optical path at the wide-angle end relating to the variable-power optical system in Example 3.

FIG. 6 is a cross sectional view traversing the optical axis (AX), representing the arrangement of lens groups in the variable-power optical system 1C of Example 3. The variable-power optical system 1C of Example 3 includes a first lens group (Gr1) having a negative optical power as a whole, an optical stop (ST), a second lens group (Gr2) having a positive optical power as a whole, and a third lens group (Gr3) having a positive optical power, in that order as viewed from the object side. To put it in more detail, the first lens group (Gr1) is composed of a biconcave negative lens (L1) and a biconvex positive lens (L2), in that order as viewed from the object side. The second lens group (Gr2) is composed of a biconvex positive lens (L3) and a biconcave negative lens (L4) arranged in that order as viewed from the object side. The third lens group (Gr3) is composed of one biconvex positive lens (L5).

In the variable-power optical system 1C of Example 3 having the aforementioned lens configuration, as shown in the bottom of FIG. 6, at the time of varying the power from the wide-angle end (W) to the telephoto end (T), the first lens group (Gr1) moves to form a convex locus projecting to the image side and the second lens group (Gr2) linearly moves toward the object. The third lens group (Gr3) is statically positioned. The optical stop (ST) travels together with the second lens group (Gr2) at the time of varying the power.

Tables 6 and 7 show the construction data of each lens in the variable-power optical system 1C of Example 3.

As shown in these Tables and FIG. 6, all the lenses (L1 through L5) are designed as lenses with double aspheric surfaces in Example 3. The first, second, fourth, and fifth lenses (L1, L2, L4, and L5) are plastic lenses and the third lens (L3) is a glass lens.

TABLE 6

| Lens surface | Curvature radius (mm) | On-axis distance between surfaces (mm) | | | Refractive index | Abbe number |
|---|---|---|---|---|---|---|
| | | W | M | T | | |
| r1* | −20.561 | 0.800 | | | 1.53048 | 55.72 |
| r2* | 3.465 | 1.634 | | | | |
| r3* | 9.740 | 1.420 | | | 1.58340 | 30.23 |
| r4* | −650.837 | 9.609 | 3.119 | 0.899 | | |
| r5 (Stop) | ∞ | 0.000 | | | | |
| r6* | 3.402 | 3.156 | | | 1.58913 | 61.24 |
| r7* | −3.501 | 0.239 | | | | |
| r8* | −3.676 | 0.917 | | | 1.58340 | 30.23 |

TABLE 6-continued

| Lens surface | Curvature radius (mm) | On-axis distance between surfaces (mm) | | | Refractive index | Abbe number |
|---|---|---|---|---|---|---|
| | | W | M | T | | |
| r9* | 5.112 | 4.522 | 8.100 | 11.462 | | |
| r10* | 13.809 | 1.494 | | | 1.58340 | 30.23 |
| r11* | −21.034 | 0.868 | | | | |
| r12 | ∞ | 0.300 | | | 1.51680 | 64.20 |
| r13 | ∞ | 0.540 | | | | |
| r14 (Image plane) | ∞ | | | | | |

TABLE 7

| Lens surface | Conic constant k | Aspheric surface coefficient | | | | | |
|---|---|---|---|---|---|---|---|
| | | A | B | C | D | E | F |
| r1 | 0 | −1.96E−03 | 3.23E−04 | −1.59E−05 | −2.64E−07 | 4.49E−08 | −9.39E−10 |
| r2 | 0 | −4.90E−03 | −1.09E−04 | 1.08E−04 | −1.52E−05 | 5.09E−07 | −2.75E−09 |
| r3 | 0 | −7.82E−04 | −3.18E−04 | 3.34E−05 | 5.06E−06 | −9.75E−07 | 3.50E−08 |
| r4 | 0 | −6.66E−04 | −4.55E−04 | 9.02E−05 | −6.65E−06 | 2.61E−08 | 6.75E−09 |
| r6 | 0 | −9.33E−04 | −1.47E−03 | 1.90E−03 | −1.24E−03 | 3.67E−04 | −4.12E−05 |
| r7 | 0 | 1.19E−02 | −2.63E−04 | −3.89E−04 | 2.54E−05 | 6.21E−05 | −1.55E−05 |
| r8 | 0 | 7.60E−03 | −1.38E−04 | 1.57E−03 | −1.44E−03 | 4.84E−04 | −5.54E−05 |
| r9 | 0 | 3.14E−03 | 1.89E−03 | 1.70E−03 | −1.34E−03 | 3.28E−04 | −6.91E−06 |
| r10 | 0 | 1.41E−03 | −1.49E−03 | 4.80E−04 | −5.83E−05 | 3.08E−06 | −5.58E−08 |
| r11 | 0 | 5.71E−03 | −3.24E−03 | 7.50E−04 | −5.41E−05 | −3.69E−07 | 1.25E−07 |

Example 4

Figure 7:
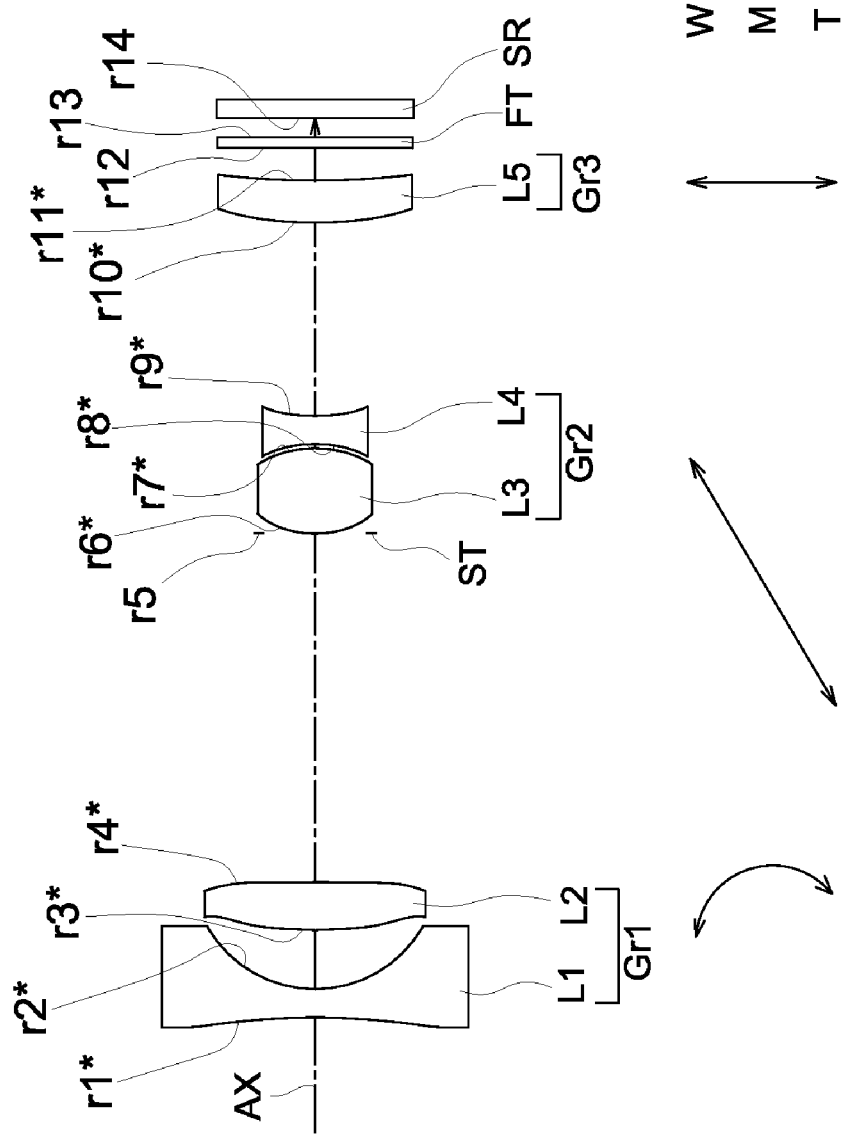
FIG. 7 is a cross sectional view showing the optical path at the wide-angle end of the variable-power optical system relating to Example 4.

FIG. 7 is a cross sectional view traversing the optical axis (AX), representing the arrangement of lens groups in the variable-power optical system 1D of Example 4. The variable-power optical system 1D of Example 4 includes a first lens group (Gr1) having a negative optical power as a whole, an optical stop (ST), a second lens group (Gr2) having a positive optical power as a whole, and a third lens group (Gr3) having a positive optical power, in that order as viewed from the object side. To put it in more detail, the first lens group (Gr1) is composed of a biconcave negative lens (L1) and a positive meniscus lens (L2) with a convex surface facing the object side, in that order as viewed from the object side. The second lens group (Gr2) is composed of a biconvex positive lens (L3) and a biconcave negative lens (L4) arranged in that order as viewed from the object side. The third lens group (Gr3) is composed of one meniscus positive lens (L5) with a convex surface facing the object side.

In the variable-power optical system 1D of Example 4 having the aforementioned lens configuration, as shown in the bottom of FIG. 7, at the time of varying the power from the wide-angle end (W) to the telephoto end (T), the first lens group (Gr1) moves to form a convex locus projecting to the image side and the second lens group (Gr2) linearly moves toward the object. The third lens group (Gr3) is statically positioned. The optical stop (ST) travels together with the second lens group (Gr2) at the time of varying the power.

Tables 8 and 9 show the construction data of each lens in the variable-power optical system 1D of Example 4. As shown in these Tables and FIG. 7, all the lenses (L1 through L5) are designed as lenses with double aspheric surfaces in Example 4. Further, all the lenses (L1 through L5) are plastic lenses.

TABLE 8

| Lens surface | Curvature radius (mm) | On-axis distance between surfaces (mm) | | | Refractive index | Abbe number |
|---|---|---|---|---|---|---|
| | | W | M | T | | |
| r1* | −21.623 | 0.800 | | | 1.53048 | 55.72 |
| r2* | 3.456 | 1.696 | | | | |
| r3* | 9.740 | 1.414 | | | 1.58340 | 30.23 |
| r4* | 234.079 | 10.014 | 3.224 | 0.899 | | |
| r5 (Stop) | ∞ | 0.000 | | | | |
| r6* | 2.938 | 2.460 | | | 1.53048 | 55.72 |
| r7* | −2.938 | 0.101 | | | | |
| r8* | −3.193 | 0.850 | | | 1.58340 | 30.23 |
| r9* | 6.541 | 5.534 | 9.087 | 12.441 | | |
| r10* | 11.478 | 1.199 | | | 1.58340 | 30.23 |
| r11* | 44.040 | 0.934 | | | | |
| r12 | ∞ | 0.300 | | | 1.51680 | 64.20 |
| r13 | ∞ | 0.540 | | | | |
| r14 (Image plane) | ∞ | | | | | |

TABLE 9

| Lens surface | Conic constant k | Aspheric surface coefficient | | | | | |
|---|---|---|---|---|---|---|---|
| | | A | B | C | D | E | F |
| r1 | 0 | −8.27E−04 | 2.65E−04 | −1.63E−05 | −1.90E−07 | 4.41E−08 | −9.49E−10 |
| r2 | 0 | −3.83E−03 | 7.84E−05 | 8.74E−05 | −1.42E−05 | 2.69E−07 | 1.33E−08 |
| r3 | 0 | −1.13E−03 | −1.14E−04 | 1.64E−05 | 5.30E−06 | −9.26E−07 | 3.24E−08 |
| r4 | 0 | −8.53E−04 | −3.77E−04 | 8.43E−05 | −5.99E−06 | −5.08E−08 | 9.61E−09 |
| r6 | 0 | −2.25E−04 | −1.91E−03 | 2.10E−03 | −1.24E−03 | 3.41E−04 | −3.61E−05 |
| r7 | 0 | 1.50E−02 | 2.71E−03 | −1.63E−03 | 2.10E−04 | 6.23E−05 | −1.54E−05 |
| r8 | 0 | 8.68E−03 | 2.90E−03 | 4.54E−04 | −1.31E−03 | 4.89E−04 | −5.54E−05 |
| r9 | 0 | 6.55E−03 | 1.73E−03 | 2.06E−03 | −1.38E−03 | 3.28E−04 | −6.91E−06 |

TABLE 9-continued

| Lens surface | Conic constant k | Aspheric surface coefficient | | | | | |
|---|---|---|---|---|---|---|---|
| | | A | B | C | D | E | F |
| r10 | 0 | 3.64E−03 | −2.69E−03 | 6.17E−04 | −5.47E−05 | 1.04E−06 | −5.27E−08 |
| r11 | 0 | 9.96E−02 | −6.00E−03 | 1.37E−03 | −1.28E−04 | 3.63E−06 | 4.86E−08 |

Example 5

Figure 8:
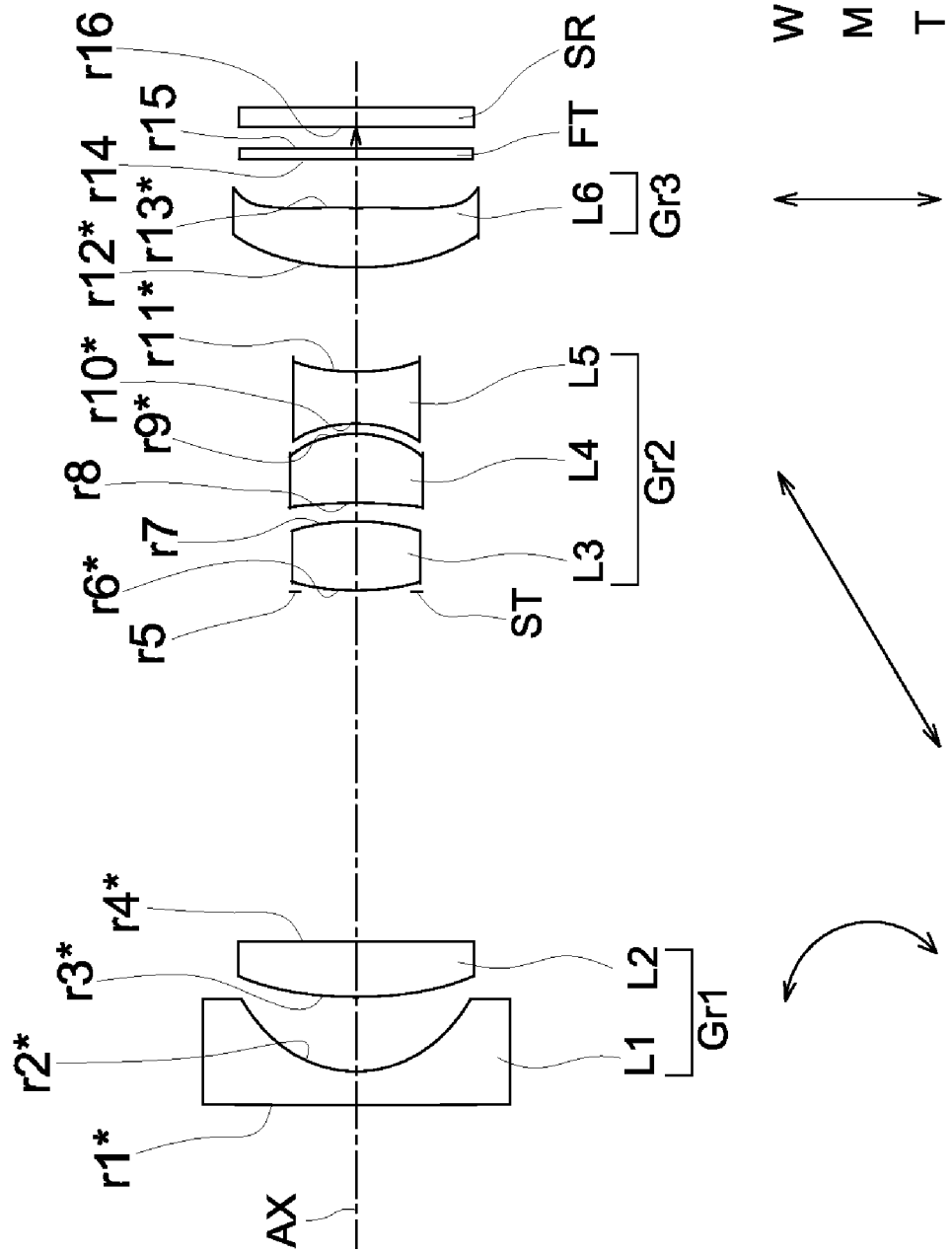
FIG. 8 is a cross sectional view showing the optical path at the wide-angle end of the variable-power optical system relating to Example 5.

FIG. 8 is a cross sectional view traversing the optical axis (AX), representing the arrangement of lens groups in the variable-power optical system 1E of Example 5. The variable-power optical system 1E of Example 5 includes a first lens group (Gr1) having a negative optical power as a whole, an optical stop (ST), a second lens group (Gr2) having a positive optical power as a whole, and a third lens group (Gr3) having a positive optical power, in that order as viewed from the object side. To put it in more detail, the first lens group (Gr1) is composed of a biconcave negative lens (L1) and a positive meniscus lens (L2) with a positive surface facing the object side, in that order as viewed from the object side. The second lens group (Gr2) is composed of a biconvex positive lens (L3), a positive meniscus (L4) lens with a convex surface facing the image side, and a biconcave negative lens (L5) arranged in that order as viewed from the object side. The third lens group (Gr3) is composed of one biconvex positive lens (L6).

In the variable-power optical system 1E of Example 5 having the aforementioned lens configuration, as shown in the bottom of FIG. 8, at the time of varying the power from the wide-angle end (W) to the telephoto end (T), the first lens group (Gr1) moves to form a convex locus projecting to the image side and the second lens group (Gr2) linearly moves toward the object. The third lens group (Gr3) is statically positioned. The optical stop (ST) travels together with the second lens group (Gr2) at the time of varying the power.

Tables 10 and 11 show the construction data of each lens in the variable-power optical system 1E of Example 5. As shown in these Tables and FIG. 8, the first, second, fifth and sixth lenses (L1, L2, L5 and L6) are designed as lenses with double aspheric surfaces in Example 5. The first, second, fifth, and sixth lenses (L1, L2, L5, and L6) are plastic lenses and the third and fourth lens (L3 and L4) are glass lenses.

TABLE 10

| Lens surface | Curvature radius (mm) | On-axis distance between surfaces (mm) | | | Refractive index | Abbe number |
|---|---|---|---|---|---|---|
| | | W | M | T | | |
| r1* | −44.638 | 0.898 | | | 1.53048 | 55.72 |
| r2* | 3.605 | 1.914 | | | | |
| r3* | 9.740 | 1.417 | | | 1.58340 | 30.23 |
| r4* | 31.060 | 8.977 | 2.962 | 0.900 | | |
| r5 (Stop) | ∞ | 0.000 | | | | |
| r6* | 5.294 | 1.779 | | | 1.58130 | 61.24 |
| r7 | −6.470 | 0.480 | | | | |
| r8 | −19.388 | 1.790 | | | 1.53407 | 64.51 |
| r9* | −3.135 | 0.271 | | | | |
| r10* | −3.380 | 1.321 | | | 1.58340 | 30.23 |
| r11* | 5.900 | 2.738 | 6.101 | 9.283 | | |
| r12* | 12.169 | 1.514 | | | 1.58340 | 30.23 |
| r13* | −32.989 | 1.199 | | | | |
| r14 | ∞ | 0.300 | | | 1.51680 | 64.20 |
| r15 | ∞ | 0.540 | | | | |
| r16 (Image plane) | ∞ | | | | | |

TABLE 11

| Lens surface | Conic constant k | Aspheric surface coefficient | | | | | |
|---|---|---|---|---|---|---|---|
| | | A | B | C | D | E | F |
| r1 | 0 | −4.06E−04 | 2.79E−04 | −1.61E−05 | −2.58E−07 | 4.46E−08 | −1.02E−09 |
| r2 | 0 | −3.08E−03 | 2.68E−04 | 9.18E−05 | −1.10E−05 | 5.07E−07 | −2.80E−08 |
| r3 | 0 | −2.69E−03 | −6.56E−05 | 4.32E−05 | 4.34E−06 | −9.65E−07 | 3.85E−08 |
| r4 | 0 | −2.34E−03 | −2.71E−04 | 9.05E−05 | −6.57E−06 | −1.02E−07 | 1.83E−08 |
| r6 | 0 | −2.78E−03 | −1.71E−03 | 1.91E−03 | −1.22E−03 | 3.69E−04 | −4.34E−05 |
| r9 | 0 | 5.09E−03 | −2.75E−04 | −2.90E−04 | 4.01E−05 | 4.18E−05 | −9.09E−06 |
| r10 | 0 | 8.30E−03 | −2.92E−03 | 1.85E−03 | −1.24E−03 | 4.79E−04 | −6.73E−05 |
| r11 | 0 | 7.20E−03 | −6.04E−04 | 3.74E−04 | −2.44E−04 | 1.03E−04 | −1.49E−05 |
| r12 | 0 | 6.25E−03 | −2.22E−03 | 5.00E−04 | −5.51E−05 | 3.05E−06 | −6.47E−08 |
| r13 | 0 | 1.13E−02 | −3.61E−03 | 6.38E−04 | −4.47E−05 | 3.89E−07 | 6.65E−08 |

Example 6

Figure 9:
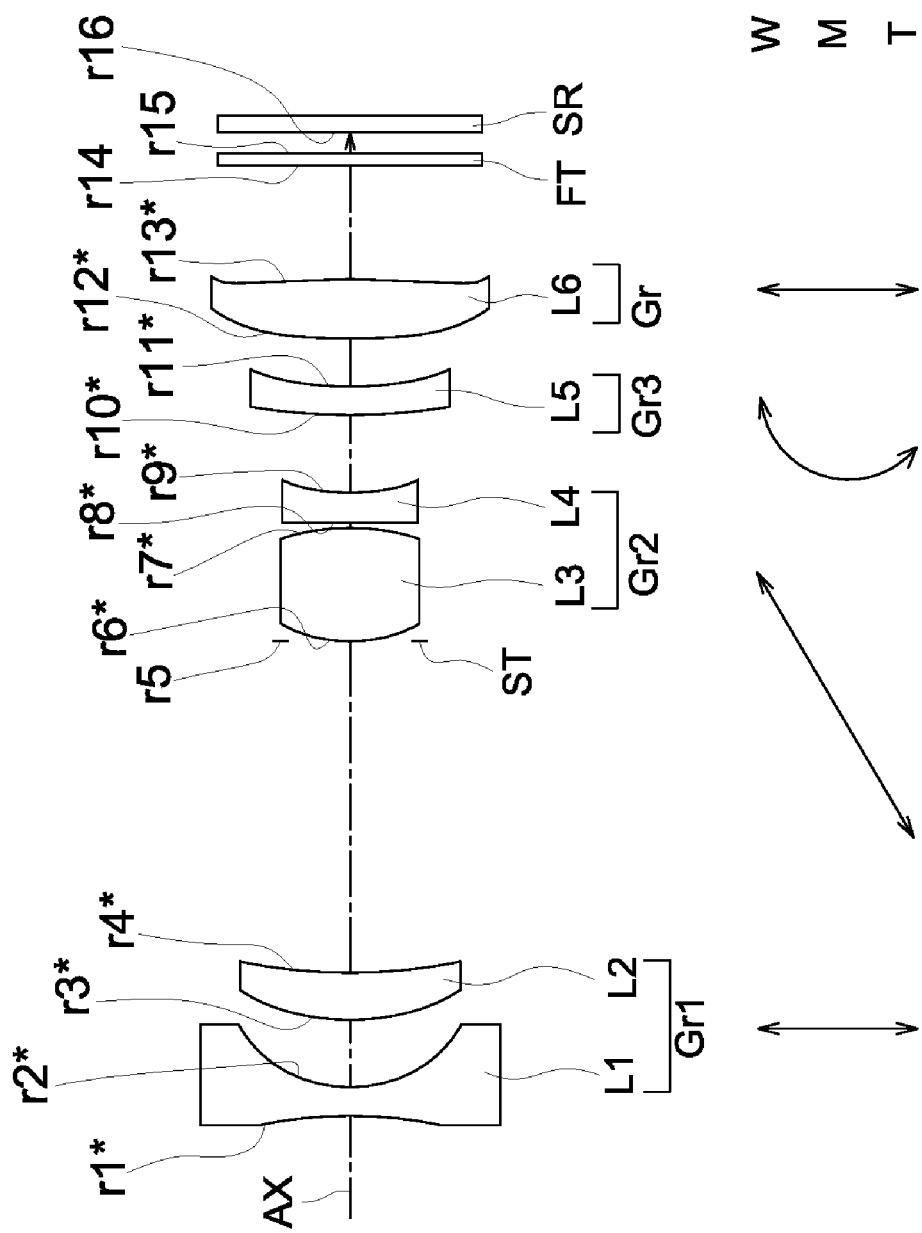
FIG. 9 is a cross sectional view showing the optical path at the wide-angle end of the variable-power optical system relating to Example 6.

FIG. 9 is a cross sectional view traversing the optical axis (AX), representing the arrangement of lens groups in the variable-power optical system 1F of Example 6. The variable-power optical system 1F of Example 6 includes a first lens group (Gr1) having a negative optical power as a whole, an optical stop (ST), a second lens group (Gr2) having a positive optical power as a whole, and a third lens group (Gr3) having a positive optical power, in that order as viewed from the object side. To put it in more detail, the first lens group (Gr1) is composed of a biconcave negative lens (L1) and a positive meniscus lens (L2) with a convex surface facing the object side, in that order as viewed from the object side. The second lens group (Gr2) is composed of a biconvex positive lens (L3), and a biconcave negative lens (L4) arranged in that order as viewed from the object side. The third lens group (Gr3) is composed of one biconvex positive lens (L5). The fourth lens group (Gr4) is composed of one biconvex positive lens (L6).

In the variable-power optical system 1F of Example 6 having the aforementioned lens configuration, as shown in the bottom of FIG. 9, at the time of varying the power from the wide-angle end (W) to the telephoto end (T), the second lens group (Gr2) linearly moves toward the object and the third lens group (Gr3) linearly moves toward the object in the manner of shifting the traveling speed at the intermediate point (M). The first lens group (Gr1) and fourth lens group (Gr4) are statically positioned. The optical stop (ST) travels together with the second lens group (Gr2) at the time of varying the power.

Tables 12 and 13 show the construction data of each lens in the variable-power optical system 1F of Example 6. As shown in these Tables and FIG. 9, all the lenses (L1 through L6) are designed as lenses with double aspheric surfaces in this Example 6. The first, second, fifth and sixth lenses (L1, L2, L5, and L6) are plastic lenses, and the third and fourth (lenses L3 and L4) are glass lenses.

TABLE 12

| Lens surface | Curvature radius (mm) | On-axis distance between surfaces (mm) | | | Refractive index | Abbe number |
|---|---|---|---|---|---|---|
| | | W | M | T | | |
| r1* | −10.492 | 0.800 | | | 1.53048 | 55.72 |
| r2* | 4.051 | 1.759 | | | | |
| r3* | 5.694 | 1.288 | | | 1.58340 | 30.23 |
| r4* | 13.367 | 8.774 | 4.462 | 0.903 | | |
| r5 (Stop) | ∞ | 0.000 | | | | |
| r6* | 3.916 | 3.000 | | | 1.58130 | 61.24 |
| r7* | −5.101 | 0.119 | | | | |
| r8* | −36.501 | 0.770 | | | 1.80542 | 26.12 |
| r9* | 5.707 | 2.065 | 1.310 | 6.375 | | |
| r10* | 20.360 | 0.750 | | | 1.53048 | 55.72 |
| r11* | 8.689 | 1.263 | 6.330 | 4.824 | | |
| r12* | 14.077 | 1.601 | | | 1.53048 | 55.72 |
| r13* | −26.166 | 3.010 | | | | |
| r14 | ∞ | 0.300 | | | 1.51680 | 64.20 |
| r15 | ∞ | 0.500 | | | | |
| r16 (Image plane) | ∞ | | | | | |

TABLE 13

| Lens surface | Conic constant k | Aspheric surface coefficient | | | | | | |
|---|---|---|---|---|---|---|---|---|
| | | A | B | C | D | E | F | G |
| r1 | 0 | 1.76E−03 | 1.88E−04 | −1.94E−05 | 7.13E−07 | −9.72E−09 | −2.93E−11 | 0.00E+00 |
| r2 | 0 | −3.13E−03 | 6.51E−04 | −9.48E−06 | 2.76E−06 | −2.24E−07 | −1.00E−08 | 0.00E+00 |
| r3 | 0 | −3.25E−03 | 9.59E−05 | 4.61E−05 | −2.71E−06 | −5.57E−08 | 9.88E−09 | 0.00E+00 |
| r4 | 0 | −1.54E−03 | 9.85E−06 | 2.39E−05 | −3.26E−08 | −2.85E−07 | 3.21E−08 | −5.22E−10 |
| r6 | 0 | −1.37E−03 | −8.33E−05 | 7.61E−05 | −9.09E−05 | 4.10E−05 | −8.86E−06 | 7.50E−07 |
| r7 | 0 | 6.92E−03 | −2.81E−04 | −3.56E−04 | 2.00E−04 | −5.29E−05 | 8.06E−06 | −4.98E−07 |
| r8 | 0 | 5.44E−04 | 9.08E−04 | −2.86E−04 | 5.95E−05 | 3.25E−06 | −1.09E−06 | 0.00E+00 |
| r9 | 0 | −1.81E−04 | 1.57E−03 | −1.34E−04 | 2.97E−05 | 0.00E+00 | 0.00E+00 | 0.00E+00 |
| r10 | 0 | −2.02E−03 | 1.29E−03 | −2.52E−04 | 2.61E−05 | −1.49E−06 | 2.63E−08 | 0.00E+00 |
| r11 | 0 | −1.84E−03 | 1.16E−03 | −1.69E−04 | 1.16E−05 | −3.39E−07 | −7.44E−09 | 0.00E+00 |
| r12 | −1 | 2.63E−03 | −7.65E−04 | 9.52E−05 | −5.23E−06 | 1.50E−07 | −1.44E−09 | 0.00E+00 |
| r13 | 0 | 3.91E−03 | −1.05E−03 | 1.13E−04 | −5.70E−06 | 1.55E−07 | −9.52E−10 | 0.00E+00 |

FIGS. 11 through 15 show spherical aberration, astigmatism, and distortion of the variable-power optical systems 1B through 1F of the aforementioned Examples 2 through 6, respectively, based on the aforementioned lens arrangements and configurations. Similarly to the case of FIG. 10, in the diagram illustrating the spherical aberration, aberrations at the time of using three beams of light having different wavelengths are shown. Namely, the one-dot chain line indicates a red color, the solid line denotes a yellow color and the broken line represents a blue color. The lens groups of all these Examples exhibit excellent optical characteristics wherein the distortion aberration is kept at 5% or less at any of the wide-angle end (W), intermediate point (M) and telephoto end (T).

Tables 14 and 15 show the focal length (in mm) and F value at the wide-angle end (W), intermediate point (M) and telephoto end (T) in each of the variable-power optical systems 1B through 1F in Examples 2 through 6. These Tables demonstrate that an optical system with a short focal length and excellent performance in terms of speed is realized, as in the case of Example 1.

TABLE 14

Focal length (mm)

|  | W | M | T |
|---|---|---|---|
| Example 1 | 4.19 | 7.96 | 11.51 |
| Example 2 | 4.25 | 8.06 | 11.68 |
| Example 3 | 4.50 | 8.55 | 12.36 |
| Example 4 | 4.49 | 8.53 | 12.33 |
| Example 5 | 4.17 | 7.90 | 11.43 |
| Example 6 | 4.94 | 8.40 | 13.59 |

TABLE 15

F value

|  | W | M | T |
|---|---|---|---|
| Example 1 | 3.29 | 4.63 | 5.90 |
| Example 2 | 3.35 | 4.66 | 5.91 |
| Example 3 | 3.40 | 4.68 | 5.90 |
| Example 4 | 3.49 | 4.73 | 5.90 |
| Example 5 | 3.21 | 4.44 | 5.60 |
| Example 6 | 3.33 | 4.55 | 5.88 |

Table 16 shows values obtained by applying the aforementioned conditional expressions (1) through (7) to each of the variable-power optical systems 1B through 1F in Examples 2 through 6.

As described above, according to the variable-power optical systems 1A through 1F of Examples 1 through 6, it is possible to provide a less expensive zoom lens that permits satisfactory correction of various forms of aberrations over the entire zoom region, and ensures a compact configuration achieved by reduced weight and reduced loads on a lens drive apparatus.

The invention claimed is:

1. A variable-power optical system comprising, in order from an object side thereof:
   a first lens group with a negative optical power;
   a second lens group with a positive optical power, moving when a power of the variable-power optical system varies; and
   a third lens group with a positive or negative optical power,
   wherein the first lens group comprises two or more lenses including one positive lens and one negative lens which include at least two or more lenses made of a plastic material, and
   the variable-power optical system satisfies the following expressions (1) through (3):

$$0.5 < |f1/f2| < 1.4, \tag{1}$$

$$0.5 < f2/fw < 2.0, \tag{2}$$

$$-3.2 < \beta 2t < -1.4, \tag{3}$$

where f1 is a focal length of the first lens,
f2 is a focal length of the second lens,
fw is a composite focal length of a total optical system of the variable-power optical system, at a wide-angle end, and
$\beta 2t$ is a image-forming magnification of the second lens group at a telephoto end.

2. The variable-power optical system of claim 1, wherein the variable-power optical system satisfies the following expression (1)', $$1.0 < |f1/f2| < 1.4 \tag{1}'$$

3. The variable-power optical system of claim 1, wherein the variable-power optical system satisfies the following expression (2)', $$1.2 < f2/fw < 1.8 \tag{2}'$$

4. The variable-power optical system of claim 1, wherein the variable-power optical system satisfies the following expression (3)', $$-2.3 < \beta 2t < -1.4 \tag{3}'$$

5. The variable-power optical system of claim 1, further comprising an aperture stop in the second lens group,

TABLE 16

Conditional expression value table

|  | Conditional expression (1) \|f1/f2\| | Conditional expression (2) f2/fw | Conditional expression (3) β2t | Conditional expression (4) Lsw/Lw | Conditional expression (5) f21/fw | Conditional expression (6) f11/ft | Conditional expression (7) v1n − v1p |
|---|---|---|---|---|---|---|---|
| Example 1 | 1.35 | 1.57 | −1.56 | 0.48 | 0.89 | −0.45 | 25.5 |
| Example 2 | 1.31 | 1.71 | −1.52 | 0.46 | 0.83 | −0.43 | 25.5 |
| Example 3 | 1.34 | 1.64 | −1.47 | 0.47 | 0.78 | −0.44 | 25.5 |
| Example 4 | 1.27 | 1.67 | −1.44 | 0.46 | 0.72 | −0.45 | 25.5 |
| Example 5 | 1.35 | 1.66 | −1.49 | 0.47 | 1.25 | −0.54 | 25.5 |
| Example 6 | 1.25 | 1.51 | −1.43 | 0.51 | 0.86 | −0.40 | 25.5 | wherein the variable-power optical system satisfies the following expression (4), $$0.25 < Lsw/Lw < 0.70, \quad (4)$$

where Lsw is a distance from the aperture stop to an image plane, at the wide-angle end, and
Lw is a total length of the variable-power optical system at the wide-angle end.

6. The variable-power optical system of claim 1,
wherein a lens at a closest position to the object side in the second lens group has a positive optical power, and
the variable-power optical system satisfies the following expression (5), $$0.2 < f21/fw < 1.6, \quad (5)$$

where f21 is a focal length of the lens at the closest position to the object side in the second lens group.

7. The variable-power optical system of claim 6,
wherein the variable-power optical system satisfies the following expression (5)', $$0.6 < f21/fw < 1.3, \quad (5)'.$$

8. The variable-power optical system of claim 1,
wherein each lens in the first lens group is formed of a plastic material.

9. The variable-power optical system of claim 1,
wherein a lens at a closest position to the object side in the first lens group has a negative optical power, and
the variable-power optical system satisfies the following expression (6), $$-1.2 < f11/ft < -0.2, \quad (6)$$

where f11 is a focal length of the lens at the closest position to the object side in the first lens group.

10. The variable-power optical system of claim 1,
wherein a lens at a closest position to an image side in the first lens group has a positive optical power.

11. The variable-power optical system of claim 1,
wherein a positive lens or lenses and a negative lens or lenses in the first lens group have Abbe numbers satisfy the following expression (7), $$10 < v1n - v1p < 35, \quad (7)$$

wherein $v1n$ is a mean Abbe number of the negative lens or lenses in the first lens group, and $v1p$ is a mean of Abbe number of the positive lens or lenses in the first lens group.

12. The variable-power optical system of claim 11,
wherein the variable-power optical system satisfies the following expression (7)', $$23 < v1n - v1p < 30, \quad (7)'.$$

13. The variable-power optical system of claim 1,
wherein the first lens group consists of two lenses.

14. The variable-power optical system of claim 1,
wherein the second lens group consists of two lenses.

15. The variable-power optical system of claim 1,
wherein the variable-power optical system adjusts a focal position from an object at an infinity distance to an object at a near distance by moving the first lens group toward the object side.

16. The variable-power optical system of claim 1,
wherein the variable-power optical system adjusts a focal position from an object at an infinity distance to an object at a near distance by moving the third lens group or a lens group arranged at a closer position to an image side than the third lens group, toward the object side.

17. The variable-power optical system of claim 1,
wherein the lenses made of a plastic material includes at least one lens formed with a material in which particles with a maximum size of 30 nm or less are dispersed into a plastic material.

18. An image pickup device, comprising:
a variable-power optical system of claim 1, and
an image pickup element converting an optical image to electric signal,
wherein the variable-power optical system is capable of forming an optical image of an object onto a light receiving surface of the image pickup element.

19. A digital apparatus comprising:
an image pickup device of claim 18, and
a controller for capturing at least one of a still image and a moving image,
wherein a variable-power optical system in the image pickup device is mounted thereto so as to be capable of forming an optical image of an object onto a light receiving surface of an image pickup element.

* * * * *

UNITED STATES PATENT AND TRADEMARK OFFICE
CERTIFICATE OF CORRECTION

PATENT NO. : 7,859,764 B2
APPLICATION NO. : 12/519566
DATED : December 28, 2010
INVENTOR(S) : Yasunari Fukuta, Soh Ohzawa and Keiji Matsusaka Page 1 of 1

It is certified that error appears in the above-identified patent and that said Letters Patent is hereby corrected as shown below:

Title Page, (73), Assignee's Address:
Delete "Hachioji-shi, Tokyo" and insert --Hachioji (JP)--, Signed and Sealed this
Fifteenth Day of February, 2011

David J. Kappos
*Director of the United States Patent and Trademark Office*